(12) United States Patent
Karam et al.

(10) Patent No.: US 9,704,232 B2
(45) Date of Patent: Jul. 11, 2017

(54) STEREO VISION MEASUREMENT SYSTEM AND METHOD

(71) Applicants: Lina Karam, Scottsdale, AZ (US); Jinjin Li, Tempe, AZ (US)

(72) Inventors: Lina Karam, Scottsdale, AZ (US); Jinjin Li, Tempe, AZ (US)

(73) Assignee: Arizona Board of Regents of Behalf of Arizona State University, Scottsdale, AZ (US)

(*) Notice: Subject to any disclaimer, the term of this patent is extended or adjusted under 35 U.S.C. 154(b) by 218 days.

(21) Appl. No.: 14/662,074

(22) Filed: Mar. 18, 2015

(65) Prior Publication Data

US 2015/0269723 A1 Sep. 24, 2015

Related U.S. Application Data

(60) Provisional application No. 61/954,926, filed on Mar. 18, 2014.

(51) Int. Cl.
*H04N 13/02* (2006.01)
*G06T 7/00* (2017.01)
(Continued)

(52) U.S. Cl.
CPC ........ *G06T 7/0004* (2013.01); *G06K 9/00201* (2013.01); *G06T 7/0006* (2013.01); *G06T 7/11* (2017.01); *G06T 7/593* (2017.01); *G06K 2209/40* (2013.01); *G06T 2207/10012* (2013.01); *G06T 2207/30152* (2013.01); *H04N 13/0239* (2013.01); *H04N 2013/0081* (2013.01)

(58) Field of Classification Search
None
See application file for complete search history.

(56) References Cited

U.S. PATENT DOCUMENTS 5,574,801 A 11/1996 Collet-Beillon
6,134,013 A 10/2000 Sirat et al.
(Continued)

OTHER PUBLICATIONS

Kalukin, Andrew R. et al., "Three Dimensional Visualization of Multilayered Assemblies Using X-Ray Laminography," IEEE Transactions on Components, Packaging, and Manufacturing Technology, Part A, vol. 20, Issue 3, Sep. 1997, IEEE, pp. 361-366.
(Continued)

*Primary Examiner* — Dakshesh Parikh
(74) *Attorney, Agent, or Firm* — Withrow & Terranova, P.L.L.C.

(57) ABSTRACT

A method for automatic, stereo vision based, in-line solder ball height and substrate coplanarity inspection includes providing an imaging setup together with an imaging processor for reliable, in-line solder ball height measurement. The imaging set up includes a pair of cameras mounted at two opposing angles with ring lighting around each camera lens, which allows the capture of two images of an electronics package in parallel. The lighting generates features on solder balls located on a substrate of the electronics package, which are then used to determine height. Specifically, points with the same intensity on each solder ball surface are grouped, which allows for the formation of curves, also known as iso-contours, which are then matched between the two views. An optimized triangulation is then performed to determine the height of each one of the solder balls.

12 Claims, 30 Drawing Sheets

(51) Int. Cl.
G06K 9/00 (2006.01)
G06T 7/593 (2017.01)
G06T 7/11 (2017.01)
H04N 13/00 (2006.01)

(56) References Cited

U.S. PATENT DOCUMENTS

| | | | |
|---|---|---|---|
| 6,177,682 | B1 | 1/2001 | Bartulovic et al. |
| 6,610,991 | B1 | 8/2003 | Case |
| 2009/0123060 | A1 | 5/2009 | Liu et al. |
| 2010/0328435 | A1 | 12/2010 | Puah et al. |

OTHER PUBLICATIONS

Kim, Pyunghyun et al., "Three-Dimensional Inspection of Ball Grid Array Using Laser Vision System," IEEE Transactions on Electronics Packaging Manufacturing, vol. 22, Issue 2, Apr. 1999, IEEE, pp. 151-155.

Ding, Hai et al., "Warpage Measurement Comparison Using Shadow Moiré and Projection Moiré Methods," IEEE Transactions on Components and Packaging Technologies, vol. 25, Issue 4, Dec. 2002, IEEE, pp. 714-721.

Udupa, Ganesha et al., "Characterization of surface topography by confocal microscopy: I. Principles and the measurement system," Measurement Science and Technology, vol. 11, Issue 3, Jan. 14, 2000, IOP Publishing Ltd., pp. 305-314.

Wang, Shihua et al., "Optical micro-shadowgraph-based method for measuring micro-solderball height," Optical Engineering, vol. 44, Issue 5, 2005, May 23, 2005, Society of Photo-Optical Instrumentation Engineers, pp. 050506-1 to 050506-2.

Dong, Mei et al., "Height Inspection of Wafer Bumps Without Explicit 3-D Reconstruction," IEEE Transactions on Electronics Packaging Manufacturing, vol. 33, Issue 2, Apr. 2010, IEEE, pp. 112-121.

Scharstein, Daniel et al., "A Taxonomy and Evaluation of Dense Two-Frame Stereo Correspondence Algorithms," International Journal of Computer Vision, vol. 47, Issue 1, May 2002, Kluwer Academic, pp. 1-35.

Klaus, Andreas et al., "Segment-Based Stereo Matching Using Belief Propagation and a Self-Adapting Dissimilarity Measure," 18th International Conference on Pattern Recognition (ICPR), vol. 3, 2006, Hong Kong, IEEE, 5 pages.

Wang, Zeng-Fu et al., "A Region Based Stereo Matching Algorithm Using Cooperative Optimization," IEEE Conference on Computer Vision and Pattern Recognition (CVPR), Jun. 23-28, 2008, Anchorage Alaska, IEEE, 8 pages.

Hartley, Richard et al., "Multiple View Geometry in Computer Vision," Second Edition, 2003, Cambridge University Press, 673 pages.

Zhang, Zhengyou, "Flexible Camera Calibration by Viewing a Plane From Unknown Orientations," The Proceedings of the Seventh IEEE International Conference on Computer Vision, vol. 1, Sep. 20-27, 1999, Kerkyra, IEEE, pp. 666-673.

Said, Asaad F. et al., "Automated Detection and Classification of Non-Wet Solder Joints," IEEE Transactions on Automation Science and Engineering, vol. 8, Issue 1, Jan. 2011, IEEE, pp. 67-80.

Lowe, David G., "Distinctive Image Features from Scale-Invariant Keypoints," International Journal of Computer Vision, vol. 60, Issue 2, Nov. 2004, Kluwer Academic Publishers, pp. 1-28.

Hong, Byung-Woo et al., "A Topographic Representation for Mammogram Segmentation," Medical Image Computing and Computer-Assisted Intervention (book), 6th International Conference, vol. 2879 of the series Lecture Notes in Computer Science, Nov. 15-18, 2003, Montreal, Canada, Springer Berlin Heidelberg, pp. 730-737.

Golub, G. H. et al., "Singular Value Decomposition and Least Squares Solutions," Numerische Mathmatik, vol. 14, Issue 5, Apr. 1970, Springer-Verlag, pp. 403-420.

Yen, H.-N. et al., "A fast full-field 3D measurement system for BGA coplanarity inspection," The International Journal of Advanced Manufacturing Technology, vol. 24, Issue 1, Jan. 10, 2004, Springer-Verlag, pp. 132-139.

Aguilar, J.J. et al., "Stereo vision for 3D measurement: accuracy analysis, calibration and industrial applications," Measurement, vol. 18, Issue 4, Aug. 1996, Elsevier Ltd., pp. 193-200.

Tay, Cho Jui et al., "Height measurement of microchip connecting pins by use of stereovision," Applied Optics, vol. 42, Issue 19, Jul. 1, 2003, Optical Society of America, pp. 3827-3831.

Tay, Cho Jui et al., "Coplanarity study on ball grid array packaging," Optical Engineering, vol. 40, Issue 8, Aug. 2001, Society of Photo-Optical Instrumentation Engineers, pp. 1608-1612.

Author Unknown, "Camera Calibration Toolbox for Matlab," Vision, CalTech.edu, Date Accessed: May 14, 2015, 5 pages, www.vision.caltech.edu/bouguetj/calib_doc/index.html#ref.

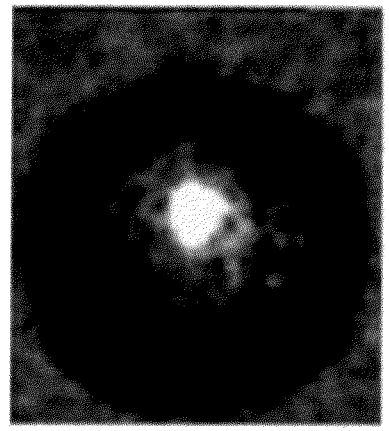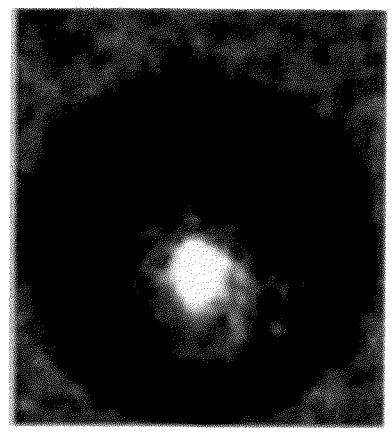
FIG. 6A
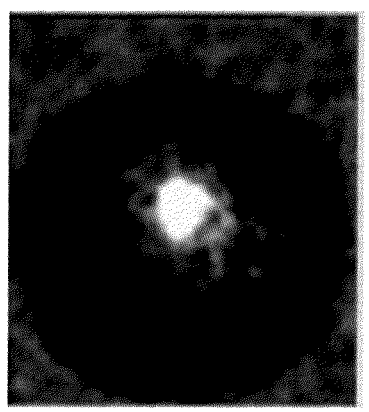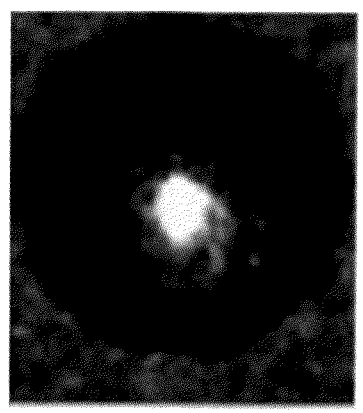
FIG. 6B

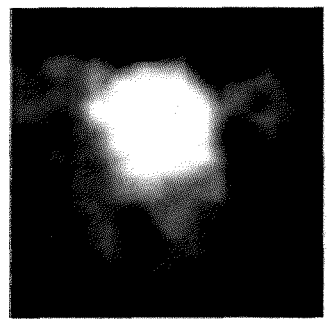
FIG. 10A1
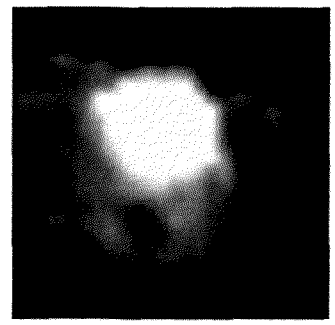
FIG. 10A2
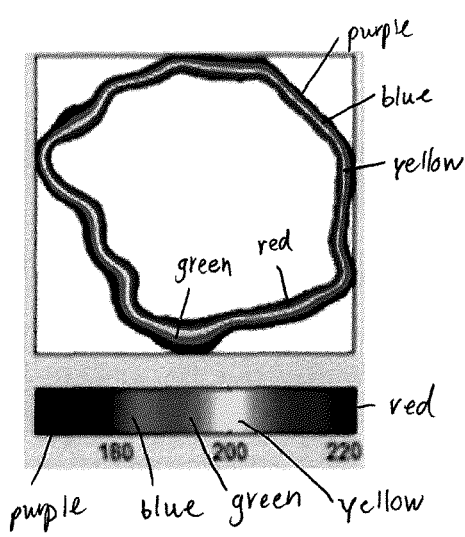
FIG. 10A3
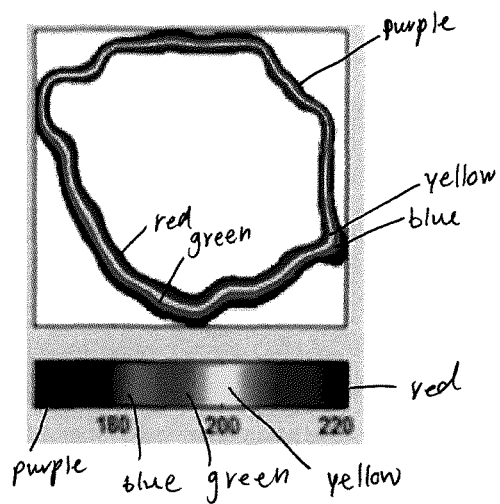
FIG. 10A4

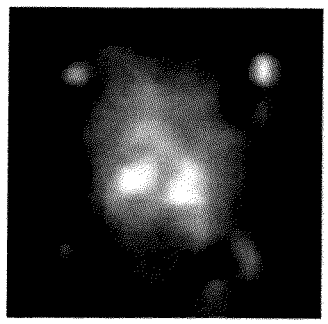
FIG. 10B1
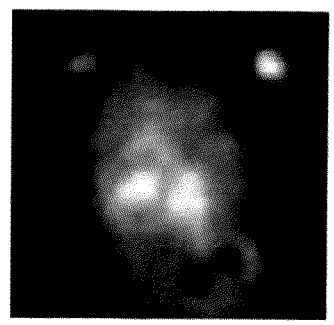
FIG. 10B2
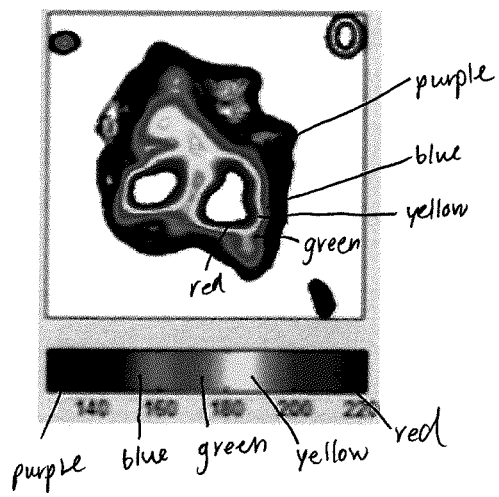
FIG. 10B3
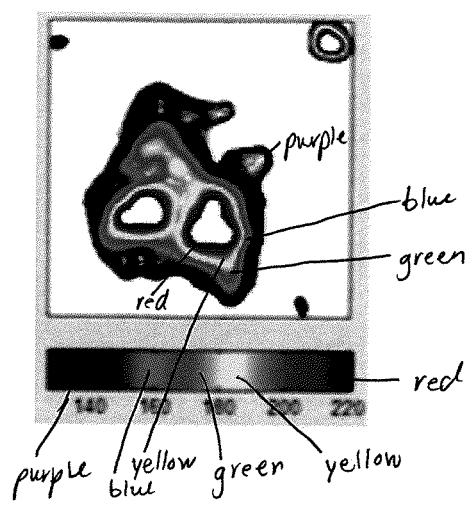
FIG. 10B4

FIG. 10C1
FIG. 10C2
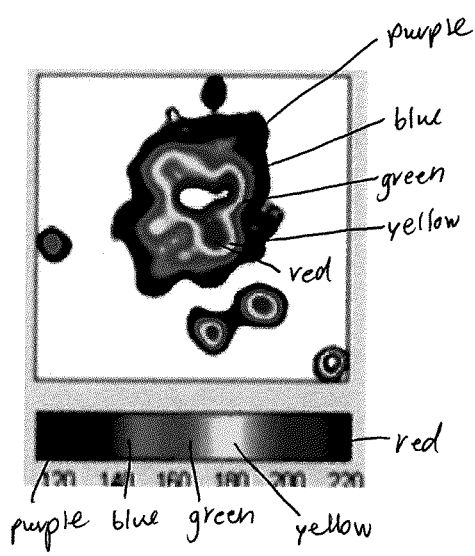
FIG. 10C3
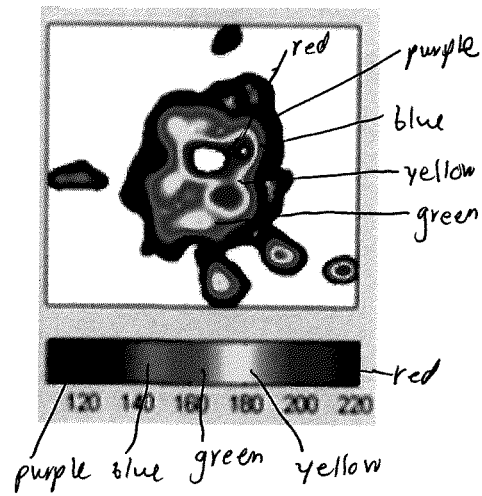
FIG. 10C4

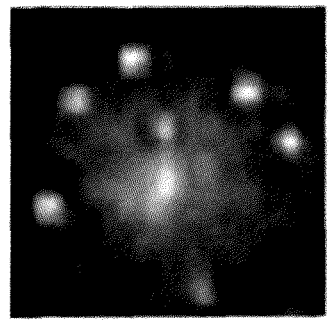
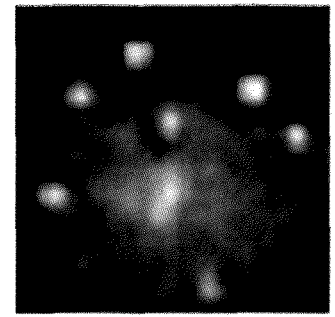
FIG. 10D1        FIG. 10D2
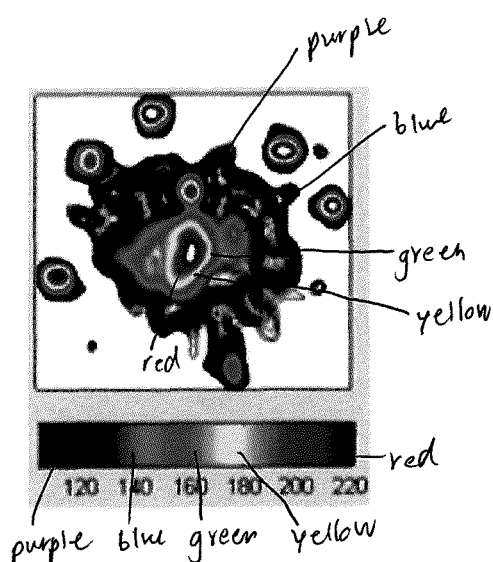
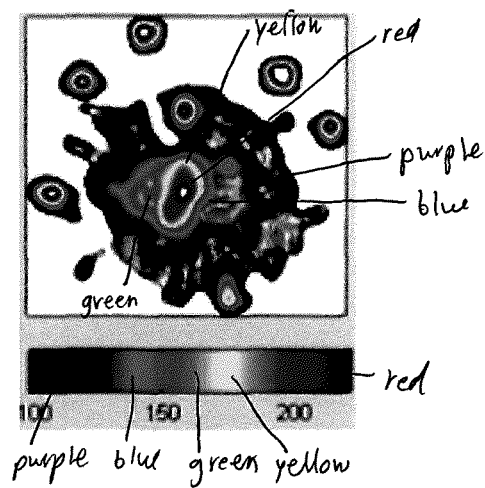
FIG. 10D3        FIG. 10D4

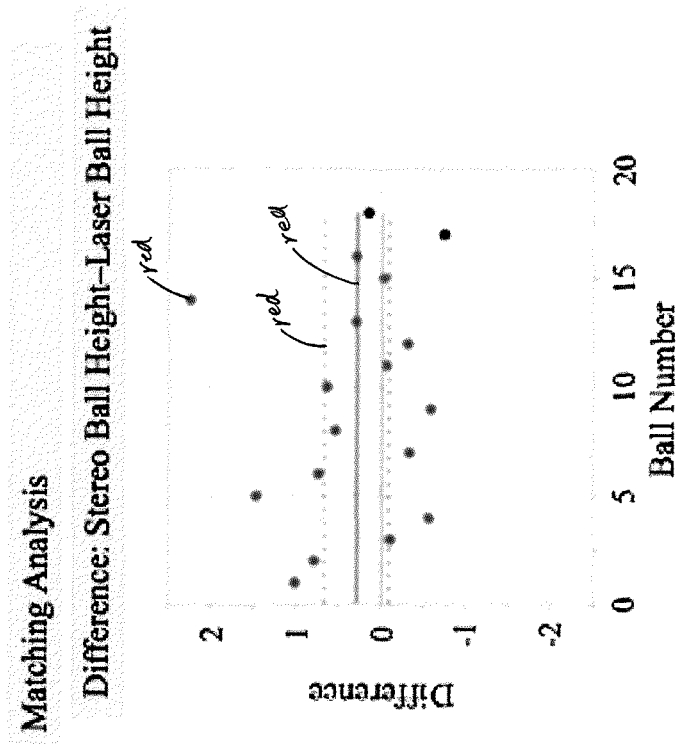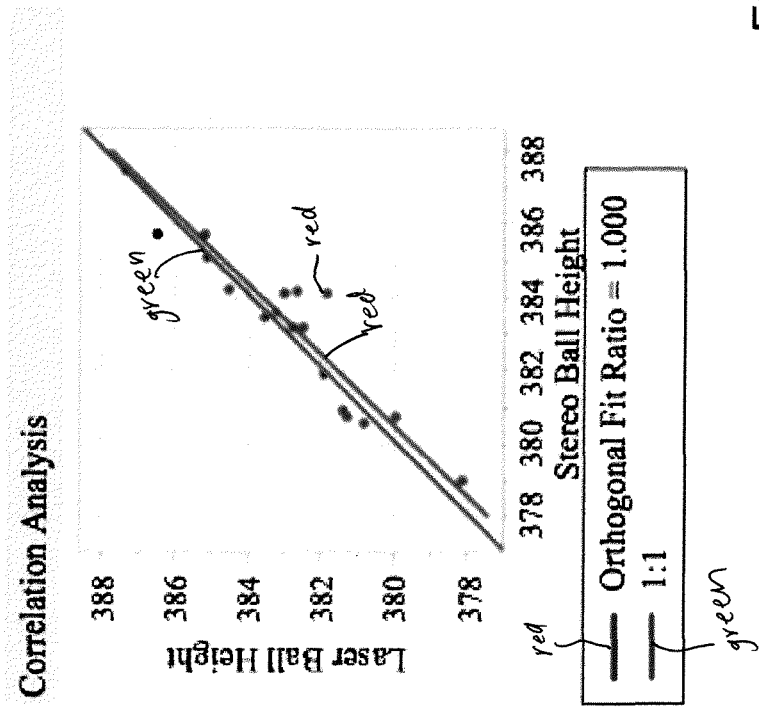
FIG. 16

STEREO VISION MEASUREMENT SYSTEM AND METHOD

RELATED APPLICATIONS

This application claims the benefit of provisional patent application Ser. No. 61/954,926, filed Mar. 18, 2014, the disclosure of which is hereby incorporated herein by reference in its entirety.

FIELD OF THE DISCLOSURE

The present disclosure relates to stereo vision measurement techniques, and specifically to stereo vision measurement techniques for measuring one or more features of an electronics package.

BACKGROUND

Solder ball height and substrate coplanarity inspection are essential to the detection of potential connectivity issues in electronics packages. Current solder ball height and substrate coplanarity inspection tools such as laser profiling, fringe projection and confocal microscopy are expensive, require complicated setup, and are slow, which makes them difficult to use in a real-time manufacturing setting (i.e., in-line). While attempts have been made to adapt stereo vision measurement techniques to inspect solder ball height and substrate coplanarity due to the low cost, high speed, and relative simplicity thereof, conventional stereo vision measurement techniques generally perform poorly at the task, if they are capable of performing at all. Conventional stereo vision measurement techniques determine the height and depth of objects by detecting corresponding feature points in two views of the same scene taken from different viewpoints. After detecting the corresponding feature points, triangulation methods are used to determine the height and depth of an object. The issue with conventional stereo vision measurement techniques is that they rely on the presence of edges, corners and surface texture for the detection of the feature points. Because solder balls generally have textureless, edgeless, and smooth surfaces, conventional stereo vision measurement techniques fail to detect a required number of feature points, and therefore cannot determine a height thereof. Accordingly, a reliable, stereo vision based, in-line solder ball height and substrate coplanarity measurement method and system is needed for inspecting electronics packages undergoing assembly.

SUMMARY

The present disclosure relates to stereo vision measurement techniques, and specifically to stereo vision measurement techniques for measuring one or more features of an electronics package. In one embodiment, a method for automatic, stereo vision based, in-line solder ball height and substrate coplanarity inspection includes providing an imaging setup together with an imaging processor for reliable, in-line solder ball height measurement. The imaging set up includes a pair of cameras mounted at two opposing angles with ring lighting around each camera lens, which allows the capture of two images of an electronics package in parallel. The lighting generates features on solder balls located on a substrate of the electronics package, which are then used to determine height. Specifically, points with the same intensity on each solder ball surface are grouped, which allows for the formation of curves, also known as iso-contours, which are then matched between the two views. An optimized triangulation is then performed to determine the height of each one of the solder balls. Furthermore, the coplanarity of the electronics package is derived from a calculated substrate depth without requiring any additional imaging setup.

In one embodiment, a solder ball height and substrate coplanarity detection system includes an imaging setup and an imaging processor. The imaging setup includes two identical area-scan cameras with the same resolution and configuration, which are placed at the same angle on two opposite sides of an electronics package. The imaging processor is coupled to the imaging setup. Ring lights are hooked on the camera lens with the same angle. The electronics package is placed in the field of view of both of the cameras. If the whole package cannot be fitted into the camera's field of view, multiple measurements on different areas are taken. The stereo images from the pair of cameras are provided to the imaging processor, where they are processed to determine a height of each one of a number of solder balls on the electronics package and a coplanarity of a substrate of the electronics package according to the method described above.

In one embodiment, each one of the cameras has a resolution of 8 GB, and are placed at about 8°-10° with respect to a top surface of the semiconductor package.

In one embodiment, before imaging of the semiconductor package, a one-time camera calibration is implemented off-line after the camera setup is finalized. For the off-line camera calibration, a number of pairs of stereo images of a planar circle pattern are taken and processed to calculate the camera parameters.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 6A and 6B show images of solder balls in various stages of evaluation according to one embodiment of the present disclosure.

FIGS. 10A1 through 10D4 show various stages of evaluation of a top surface of a solder ball according to on embodiment of the present disclosure.

Figure 11:
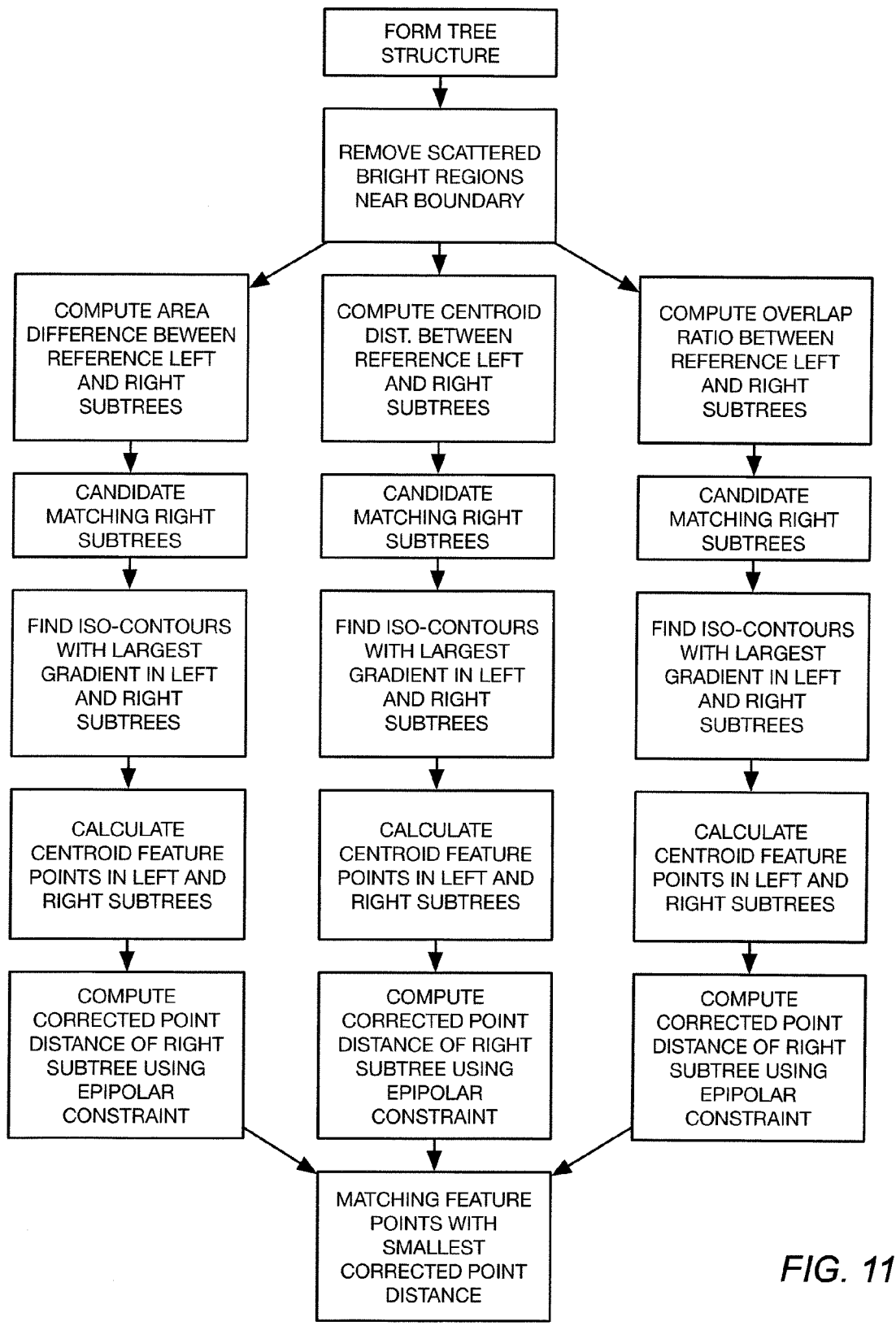
Figure 12A:
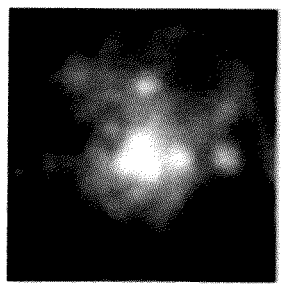
Figure 12B:
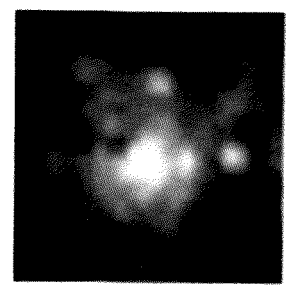
Figure 12C:
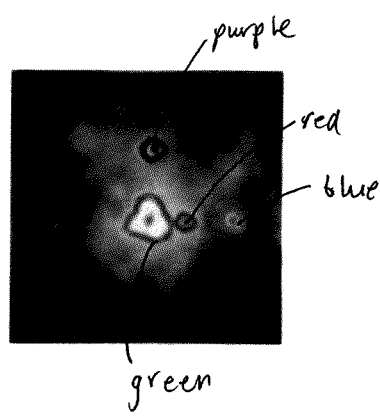
Figure 12D:
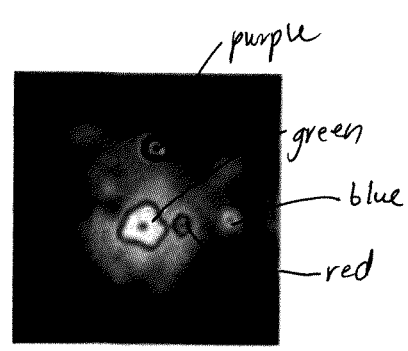

FIG. 11 is a flow chart illustrating a method for detecting one or more peak feature points of a solder ball according to one embodiment of the present disclosure.

FIGS. 12A through 12D illustrate an iso-contour matching process according to one embodiment of the present disclosure.

Figure 13:
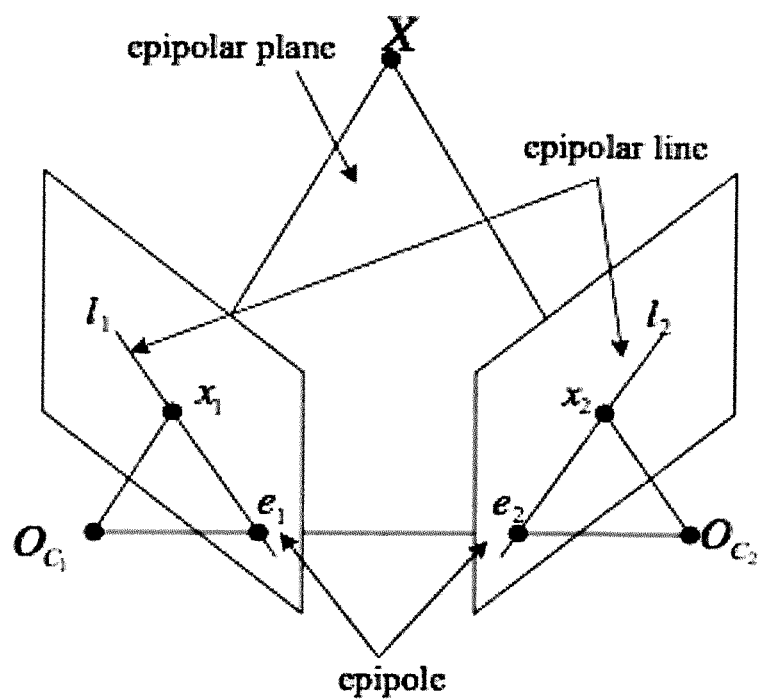

FIG. 13 is a diagram illustrating the relationship between two views in terms of epipolar geometry according to one embodiment of the present disclosure.

Figure 14A:
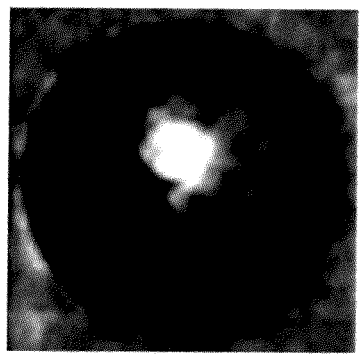
Figure 14B:
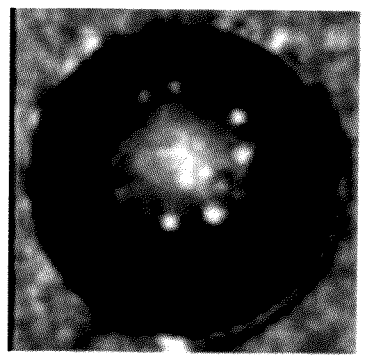
Figure 14C:

FIGS. 14A through 14C show different types of solder balls according to various embodiments of the present disclosure.

Figure 15A:
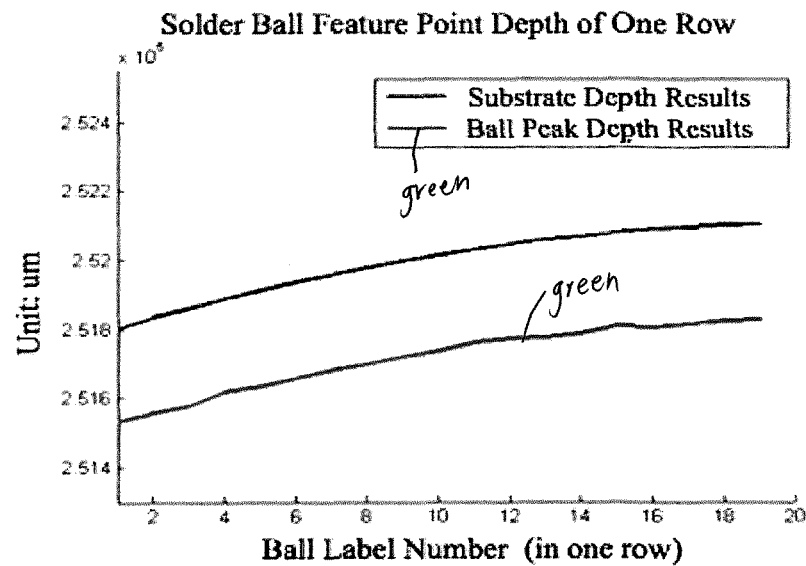
Figure 15B:
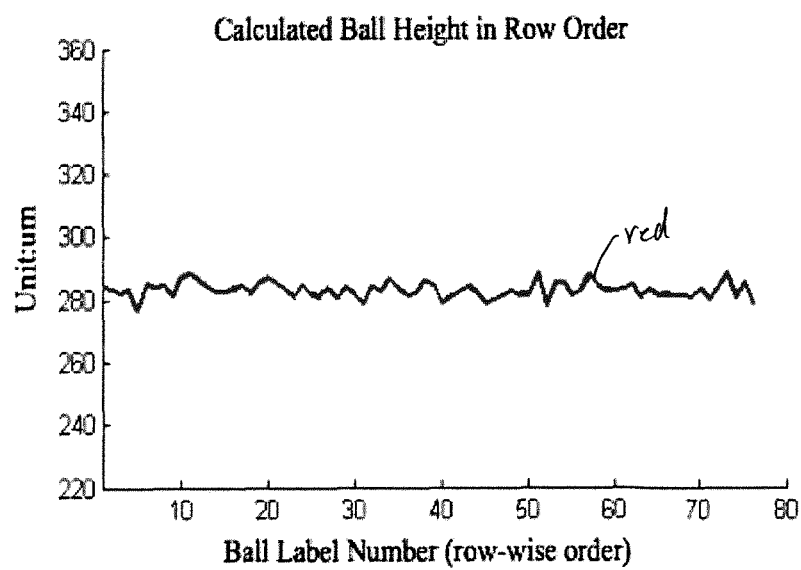

FIGS. 15A and 15B age graphs illustrating the result of one or more solder ball height determinations according to one embodiment of the present disclosure.

FIG. 16 is a graph illustrating an accuracy analysis of solder ball height results according to one embodiment of the present disclosure.

Figure 17:
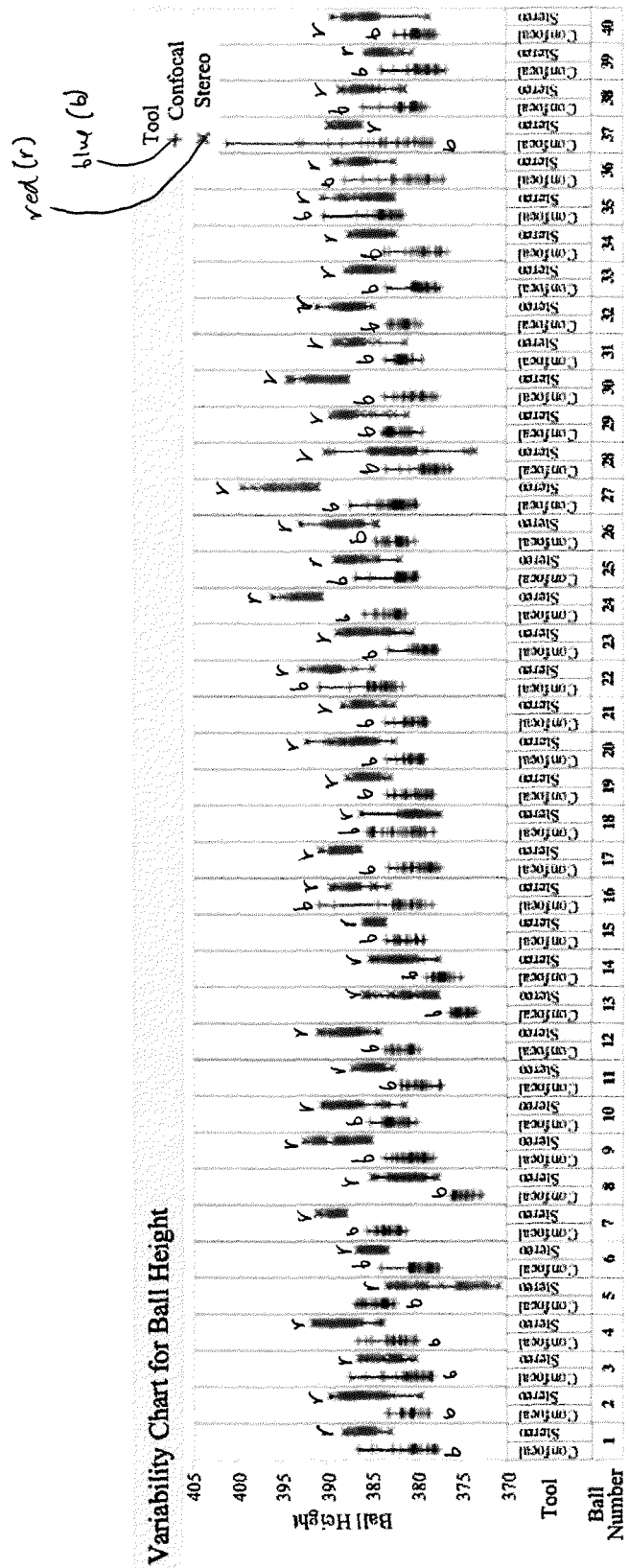

FIG. 17 is a graph illustrating a repeatability analysis of solder ball heights according to one embodiment of the present disclosure.

Figure 18A:
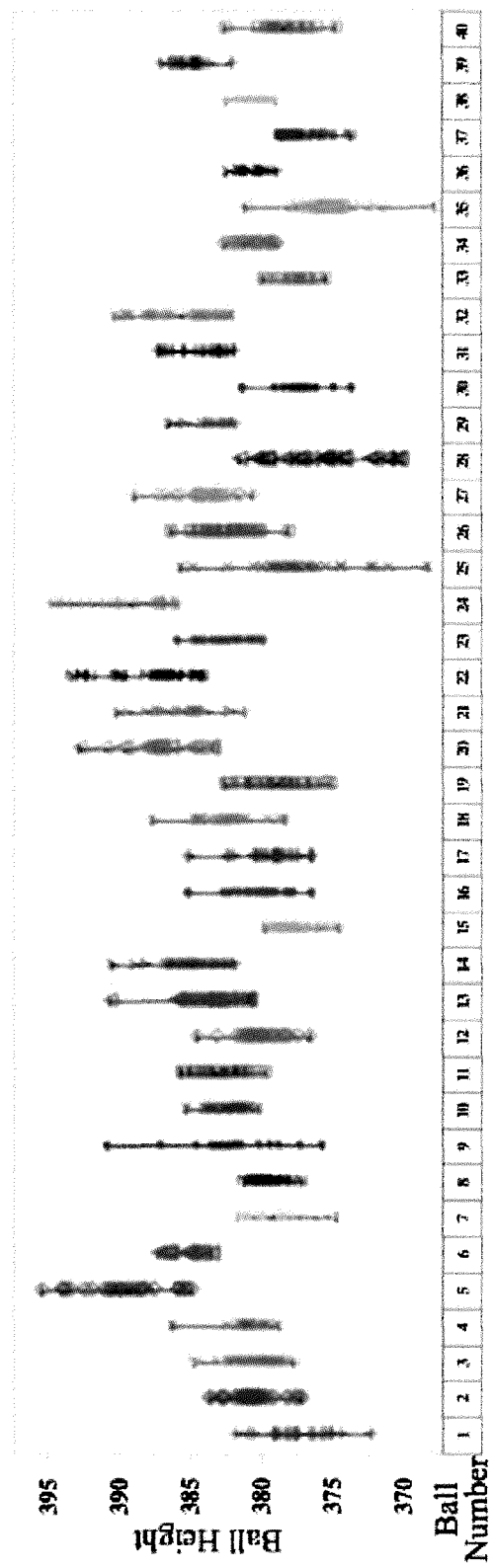
Figure 18B:
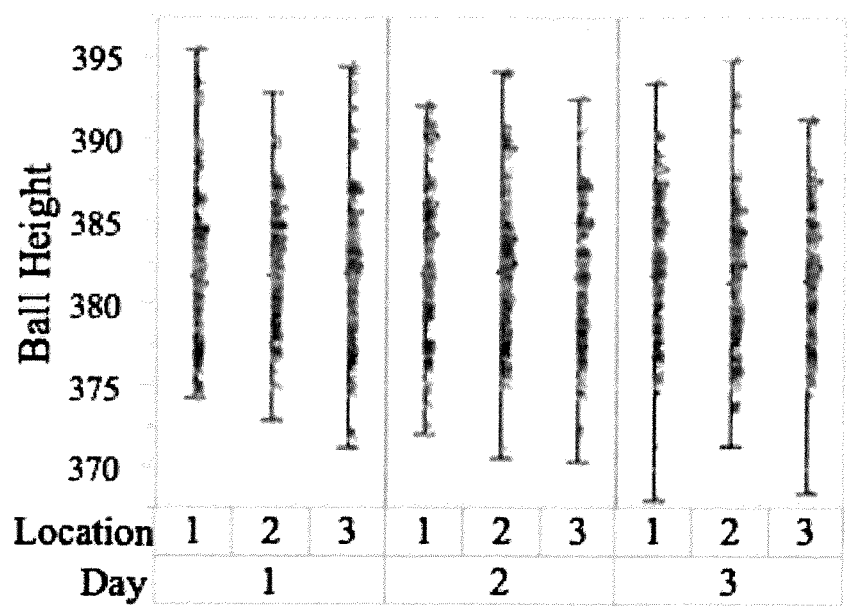

FIGS. 18A and 18B are graphs illustrating a reproducibility analysis of solder ball heights according to one embodiment of the present disclosure.

Figure 19:
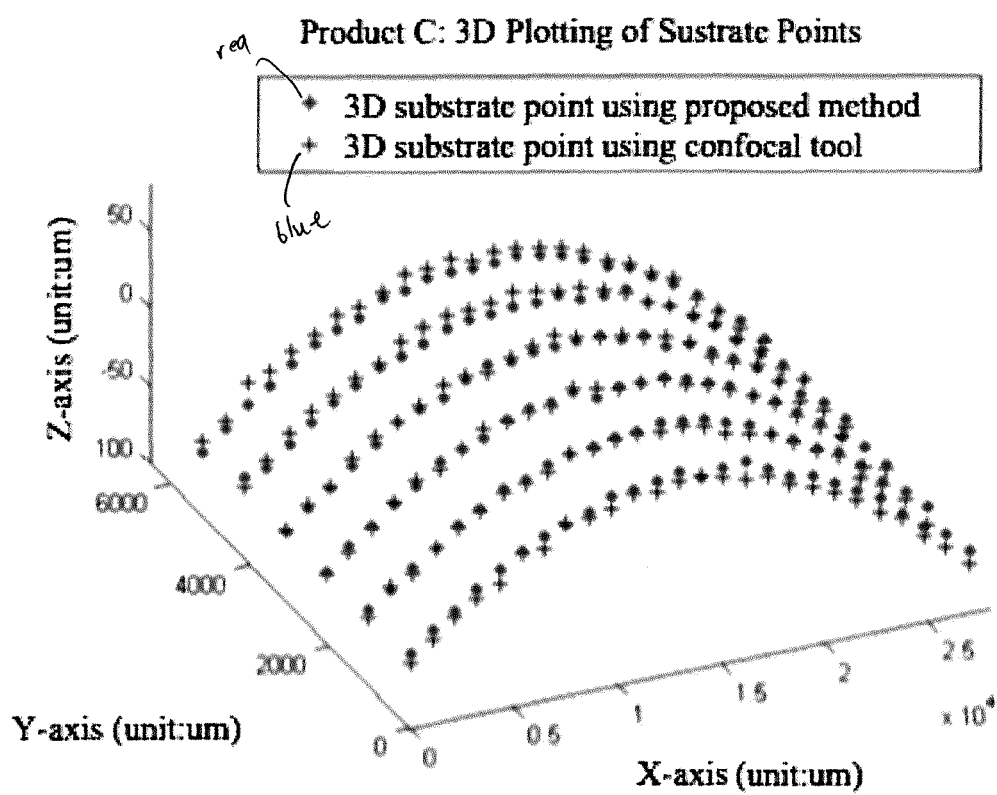

FIG. 19 is a graph illustrating a comparison between substrate heights for different measurement methods according to one embodiment of the present disclosure.

Figure 20:
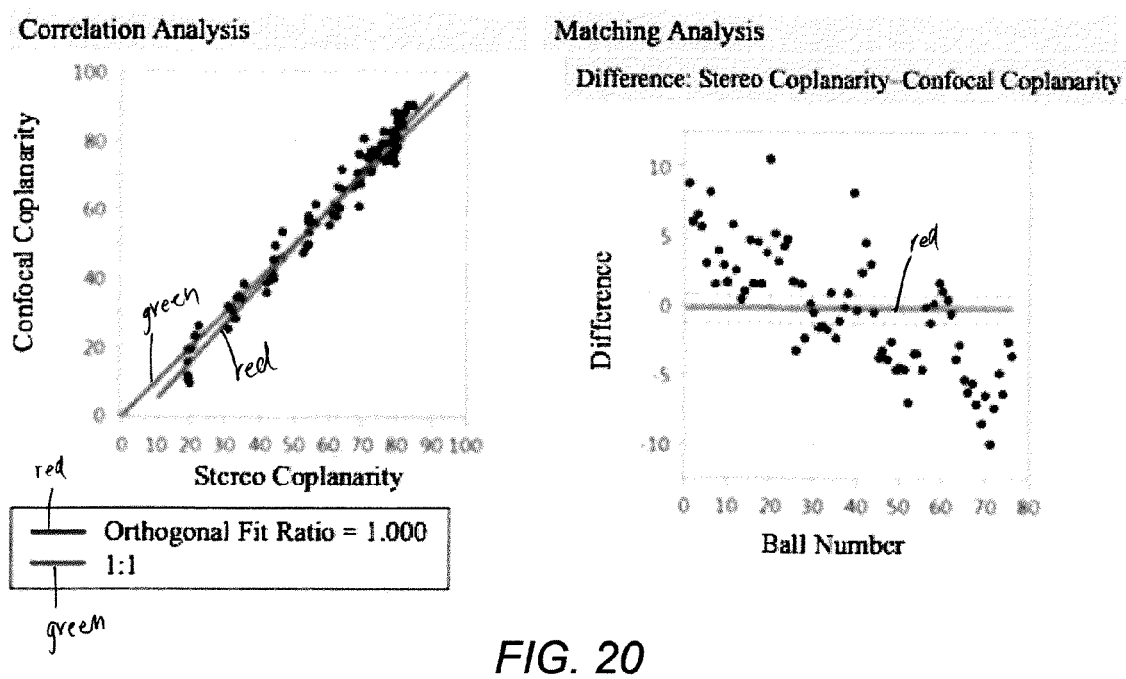

FIG. 20 is a graph illustrating an accuracy analysis of substrate coplanarity results according to one embodiment of the present disclosure.

Figure 21:
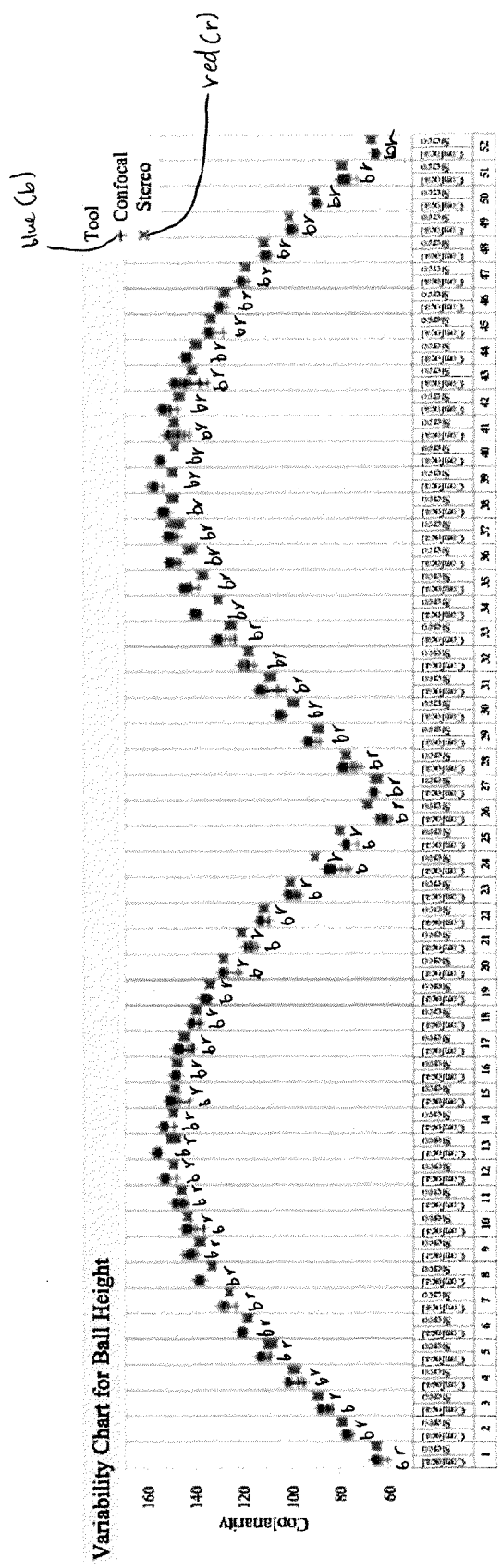

FIG. 21 is a graph illustrating a repeatability analysis of substrate coplanarity results according to one embodiment of the present disclosure.

Figure 22A:
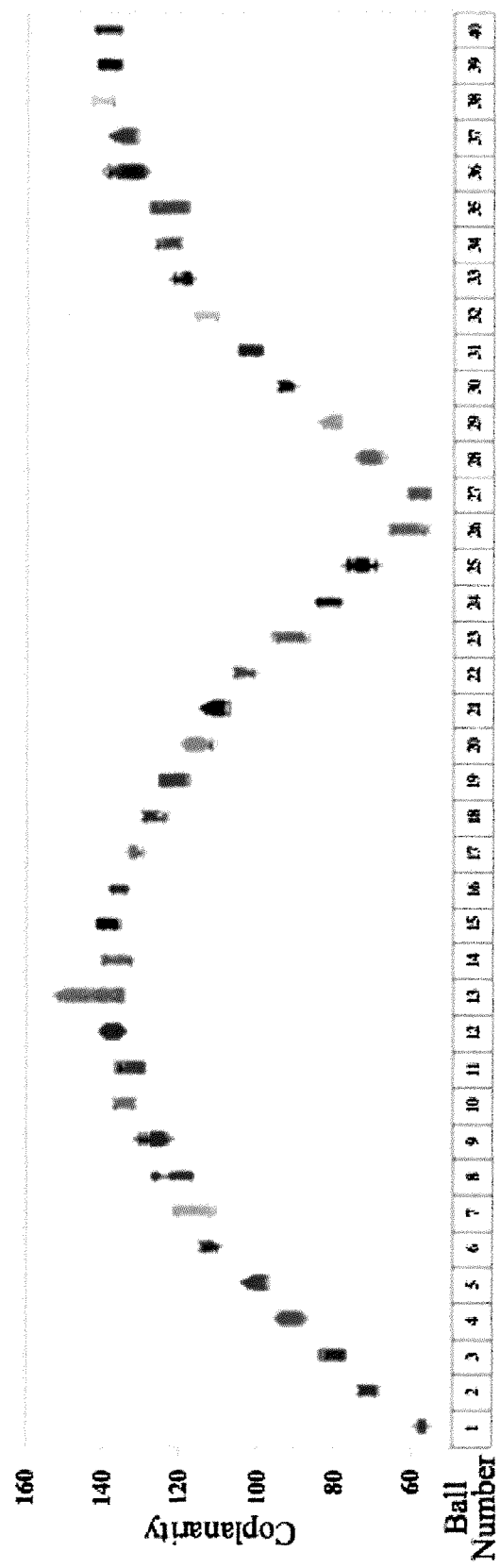
Figure 22B:
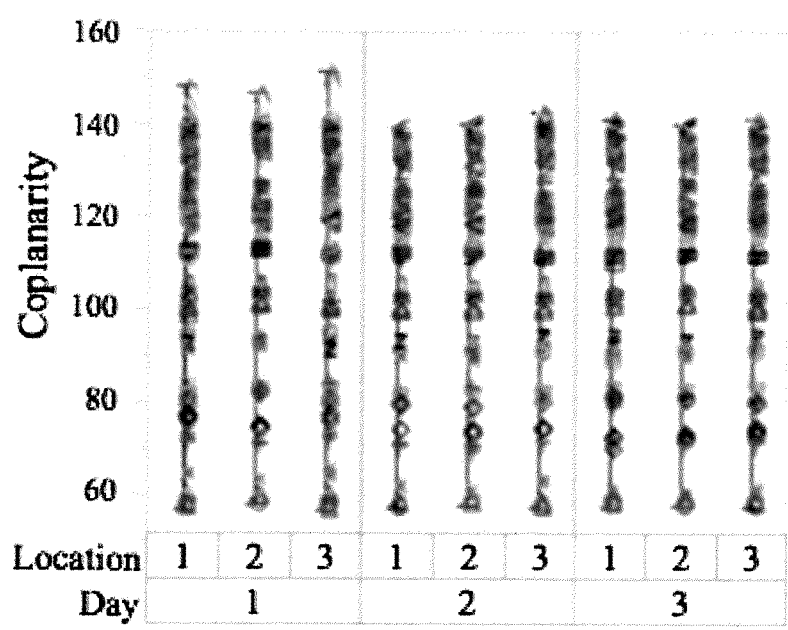

FIGS. 22A and 22B are graphs illustrating a reproducibility analysis of substrate coplanarity results according to one embodiment of the present disclosure.

Figure 23:
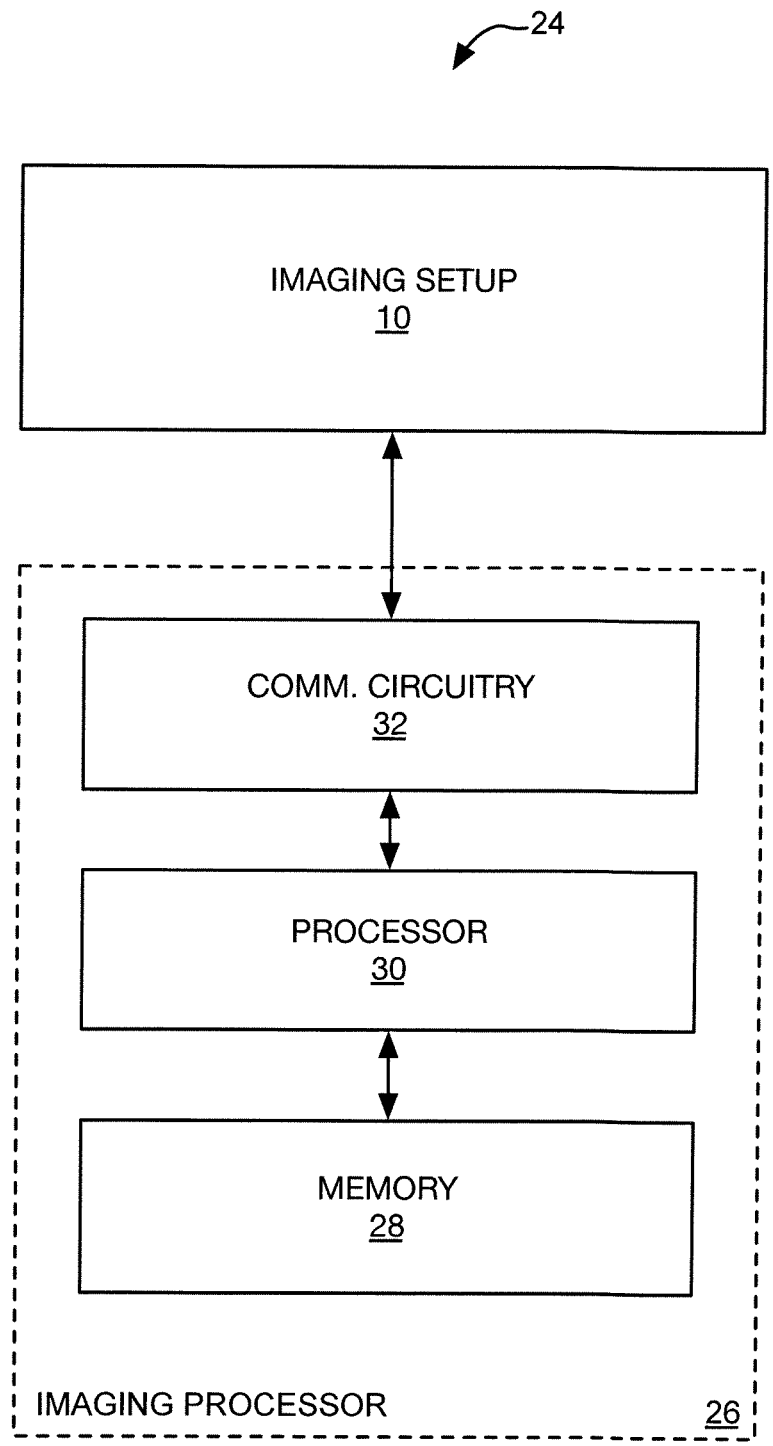

FIG. 23 is a block diagram illustrating an imaging processing system according to one embodiment of the present disclosure.

Figure 24:
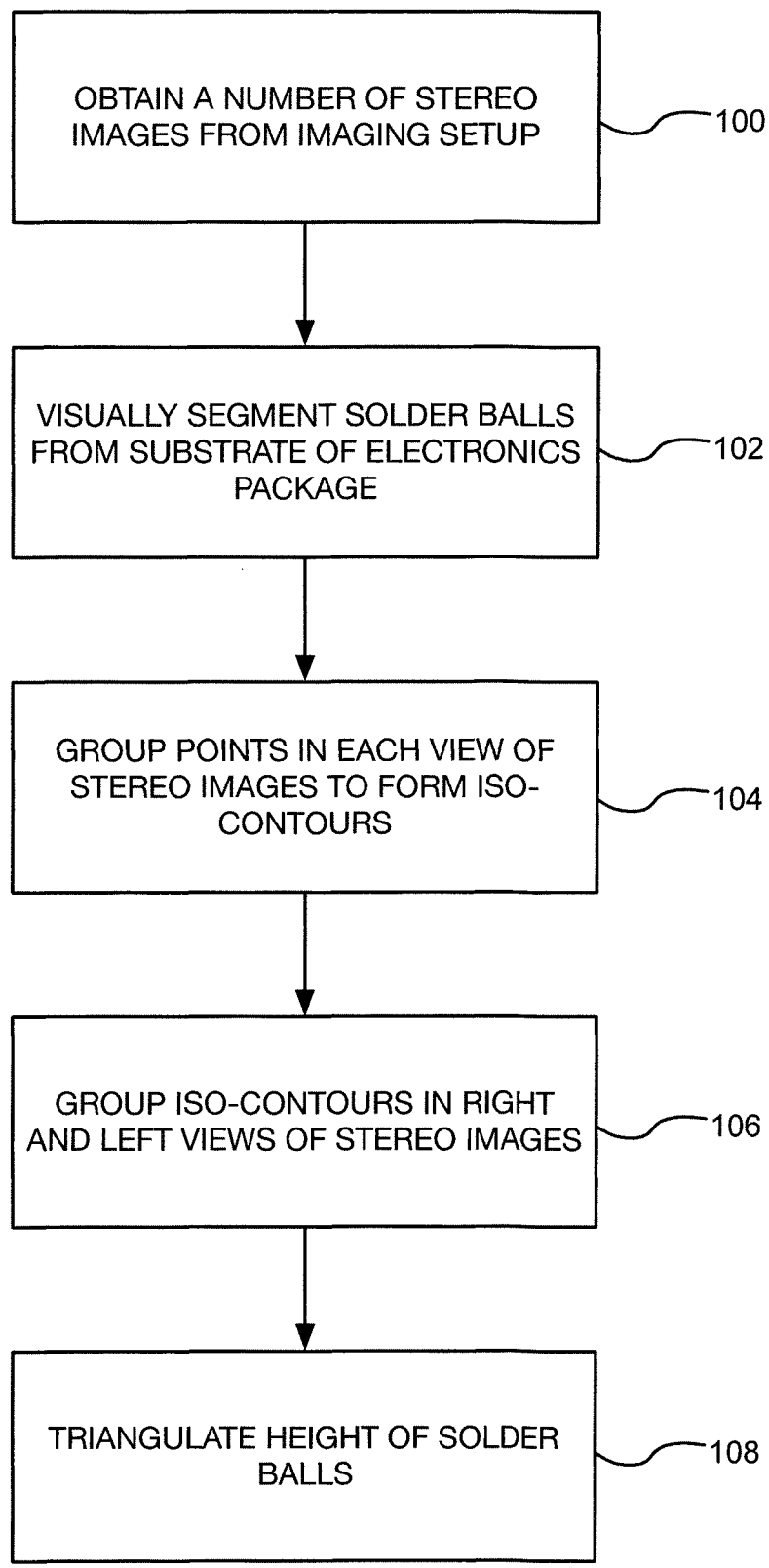

FIG. 24 is a flow chart illustrating a method of characterizing one or more features of an electronics package according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Defective solder joints in electronics packages such as ball grid array (BGA) electronics packages can cause problems such as non-wets, infant mortality, and failed parts. In order to reduce the potential for late detection of warped or defective parts, which may result in potential added cost for a defective unit and shipment of defective parts to a customer, the inspection of solder joints of electronics packages is an important process in manufacturing. Solder joint bonding ability and reliability is highly dependent on the uniformity of solder ball heights and coplanarity across a unit substrate. Non-uniform solder ball heights can result in non-wets, which cause connectivity failures and result in failed units. Substrate warpage can also cause connectivity failures and result in infant mortality due to connectivity failures at joints with minimal or weak connectivity. Thus the inspection of solder ball heights is essential in the detection and identification of defects in a timely manner before defective units escape to the customer.

Numerous methods have been developed in recent years for solder ball height and coplanarity measurements. Conventional methods such as visual inspection and in-circuit functional tests are not able to analyze the solder ball layout and height information, and they are usually time-consuming and produce variable results. More recently, automated methods have been developed to produce more reliable and accurate ball height and coplanarity results. These methods include 3D X-ray laminography, laser scanning, Moiré projection (Fringe Moiré and shadow Moiré), confocal microscopy, shadow graph, and machine vision methods.

A common factory floor tool for warpage inspection uses a model-based method, which requires a-priori reference and calibration by a microscope tool tested on several hundred electronics packages for each type of product. The sampling and testing procedure of the reference microscope tool is time-consuming. This factory floor tool assumes uniform solder ball height from the model height, and is not able to compute the absolute solder ball height for each solder ball. If the incorrect model solder ball heights are used, there will be misdetection of warpage and potential for defects and escapees due to a failure to detect incorrect solder ball sizes.

One conventional machine vision method for detecting solder ball height and substrate coplanarity acquires images of an electronics package using two cameras with directional lighting and, for each image, locates peaks of the solder balls by determining the position of the brightest point in each solder ball region. However, the assumption that the peaks of the solder balls correspond to the highest intensity points is not valid in practice. In addition, the previously described method only calculates the position of the solder ball peaks with respect to an origin of the image and does not calculate the peak heights of the solder balls. Further, the method assumes that the majority of solder ball peaks are co-planar, which implies that most of the solder balls have the same height, and uses this assumption to determine a linear planar transformation (homography) describing the relation between the solder ball peak positions in the two views. A computed transformation is then applied to the positions of solder ball peaks in one view. The deviation between the resulting transformed positions and the actual positions in the second view is computed and used to flag solder balls with large deviations as defective.

Similar to the conventional machine vision method described above, additional machine vision methods use two area-scan cameras at different angle setups and different lighting conditions to calculate the solder ball height and coplanarity. However, all of these conventional machine vision methods have several deficiencies and drawbacks: a first one of these methods assumes that the substrate points are lying on the same plane, and then calculates the individual ball height from the fitted substrate plane and an estimated average ball height value; a second and third one of these methods require a complex calibration process of the camera poses, multiple images for the whole package inspection, and more importantly, they all require a reference solder ball with known solder ball height in the field of view for each image. Thus these machine vision methods are not sufficient to detect the true solder ball height and coplanarity without any prior knowledge and not suitable for real-time computation.

An additional set of conventional automated solder ball height and substrate coplanarity detection methods are able to provide relatively more accurate results as compared to the aforementioned conventional machine vision methods, but they usually require high-cost equipment and complicated setup, and the measuring speed is slow. The Moiré projection method projects periodic fringe patterns on the surface of an electronics package and generates absolute ball height and coplanarity from the deformation of the projected waveforms on the solder ball packages. However, the phase unwrapping in the Moiré projection methods can produce inaccuracy in the ball height results, and it is computationally intensive and time consuming. The motion control system and integrated workstation of the Moiré projection methods are usually expensive and require complex training.

Another height inspection method calculates absolute solder ball height from a shadowgraph of solder balls in the images generated by an oblique collimated light source. However, this method is only used for certain types of electronics packages, and therefore may not be suitable for certain applications. Further, the collimated light setup requires a number of expensive optical lenses. Finally, the size of the whole setup is large and is not suitable for in-line manufacturing solder ball inspection operations. Due to the set up complexity and limited execution speed, existing automated solder ball height and substrate coplanarity measuring methods are not suitable for a real-time inspection process. Accordingly, a reliable, fast, in-line ball height and coplanarity measurement method is needed for inspecting units undergoing assembly.

Existing stereo vision measurement techniques determine the height and depth of objects by detecting corresponding feature points in two views of the same scene taken from different viewpoints. The images in stereo matching research are usually taken from a natural scene or manmade objects, which have distinct features for each object in the scene for matching, such as color and gradient. There are various methods proposed for stereo matching, but a common issue with existing techniques is that they rely on the presence of edges, corners and surface texture for the detection of feature points. Therefore, these techniques cannot be applied to the measurement of solder ball height due to the textureless, edgeless, smooth surfaces of solder balls.

As discussed in detail below, an automatic, stereo vision based, in-line ball height and coplanarity inspection system and method is presented. Referred to herein as an iso-contour stereo vision image analysis technique (or techniques), the method is computationally efficient compared to other image processing techniques for solder ball height detection and is shown to exhibit high accuracy, repeatability and reproducibility. Additionally, the imaging setup procedure and equipment of the proposed system is much simpler than other existing methods. The proposed system includes an imaging setup together with an image processor for reliable, in-line solder ball height measurement. The imaging set up includes two different area-scan cameras mounted at two opposing angles with ring lighting around each camera lens, which allows the capture of two images of an electronics package (e.g., a semiconductor device or package including solder balls such as a BGA package) in parallel. The lighting generates features on the solder balls, which are then used to determine height. The image processing circuitry is configured to calibrate the stereo cameras, segment individual solder balls, detect substrate feature points and solder ball peak feature points in stereo views, triangulate corresponding points, and calculate solder ball height and substrate coplanarity. The camera parameters, including intrinsic parameters and extrinsic parameters, are calculated in a calibration process. The segmentation of each individual solder ball is achieved using histogram thresholding and a boundary circle-fitting algorithm. The substrate feature points are detected in the segmented individual solder ball region, and the solder ball peak feature points are determined by grouping points with the same intensity on the solder ball surface, which allows the formation of curves, also known as iso-contours, that are then matched between the two views. Finally, an optimized triangulation is performed to determine feature point depth and solder ball height, and coplanarity is calculated from the determined substrate depth.

The iso-contour stereo vision image analysis techniques discussed herein were tested on three different types of electronics packages, each of which have different solder ball sizes, solder ball surface appearance, solder ball pitch, and solder ball layout. The results are evaluated in a measurement capability analysis (MCA) procedure and compared with the ground-truth obtained by an existing laser scanning tool and an existing confocal inspection tool. The laser scanning tool and the confocal tool are primarily suitable for sampling measurements due to slower speed and lengthy calibration process. The accuracy of solder ball height of the techniques herein are compared with the solder ball height measurement capability of the laser scanning tool, and a correlation of 0.94 is achieved. The coplanarity of an electronics package is determined from the computed substrate depth results in the proposed techniques. The results show that the proposed techniques are capable of calculating the ball height and warpage on electronics packages, and that the produced results are comparable to the results produced by other methods that require significantly more expensive equipment and complicated processing software.

Figure 1:
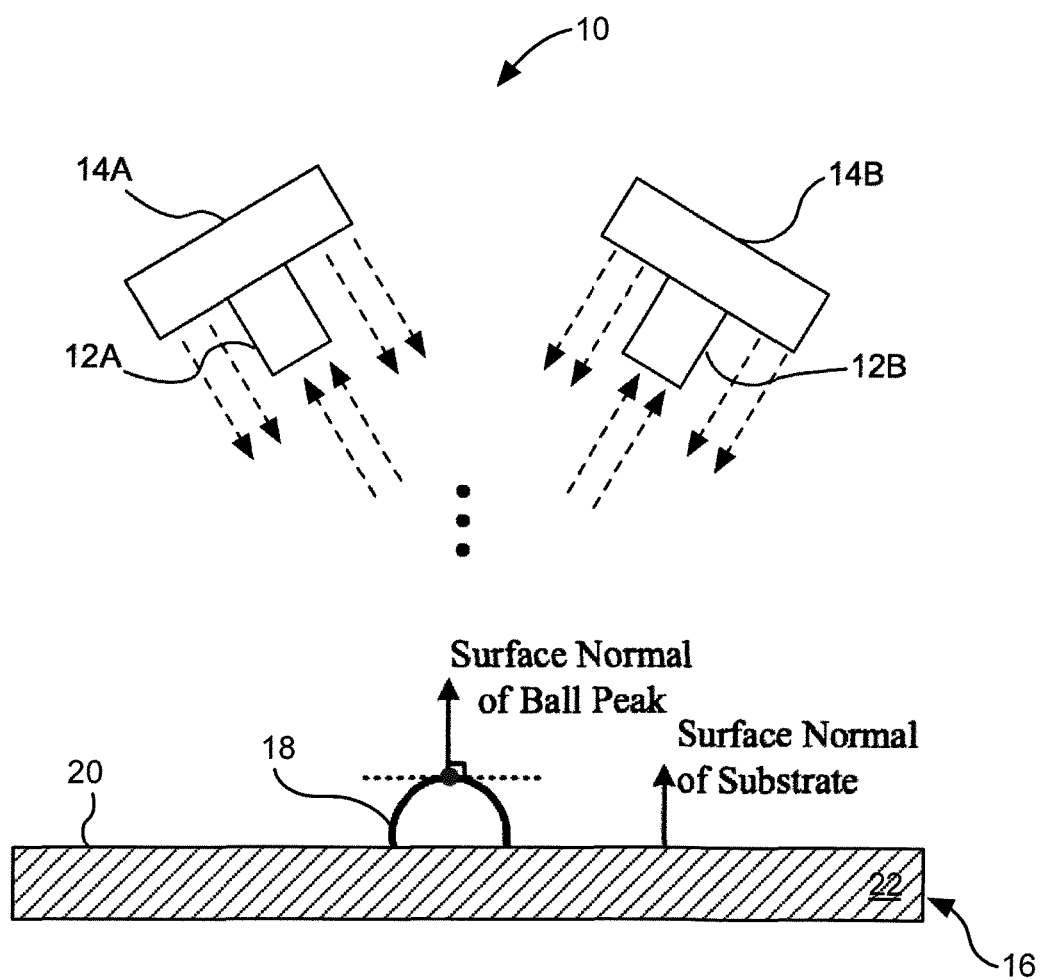
FIG. 1 is an imaging setup according to one embodiment of the present disclosure.

Since the size of solder balls on a typical BGA electronics package is relatively small (200-400 um in diameter for different types of BGA electronics packages), in order to obtain repeatable and reliable ball height results, the setup of the stereo cameras is required to be precise and stable when imaging such small-size objects. FIG. 1 shows an imaging setup 10 according to one embodiment of the present disclosure. The imaging setup 10 uses two cameras 12 mounted at two opposite angles with a ring light 14 around each camera lens, which allows the capture of two images of an electronics package 16 in parallel. The electronics package 16 is placed within the cameras 12 field of view. The ring light 14 around each camera 12 generates straight light beams that shine on top of a solder ball 18 surface, which is on a top surface 20 of a substrate 22 of the electronics package 16. The surface of the solder ball 18 is reflective to directional light. It is assumed that, with the previously described setup, the solder ball peak points on the solder ball surface that have the same surface normal with that of the top surface 20 of the substrate 22 will reflect illumination into the camera 12, as shown in FIG. 1. Accordingly, these solder ball peak points will appear bright in the captured images. Other points, whose surface normal vectors have a direction that is different from that of the normal of the top surface 20 of the substrate 22, will reflect the directional light to other directions that cannot be captured by the camera 12, and thus appear darker in the captured images. In the stereo images captured by the cameras 12, the bright regions near the center of each individual solder ball 18 contain the ball peak area of the solder balls. In an initial calibration of the imaging setup 10, the position of the electronics package 16 and the ring lights 14 are adjusted so that maximum brightness is achieved in an area surrounding the solder ball peaks in both views.

Figure 2A:
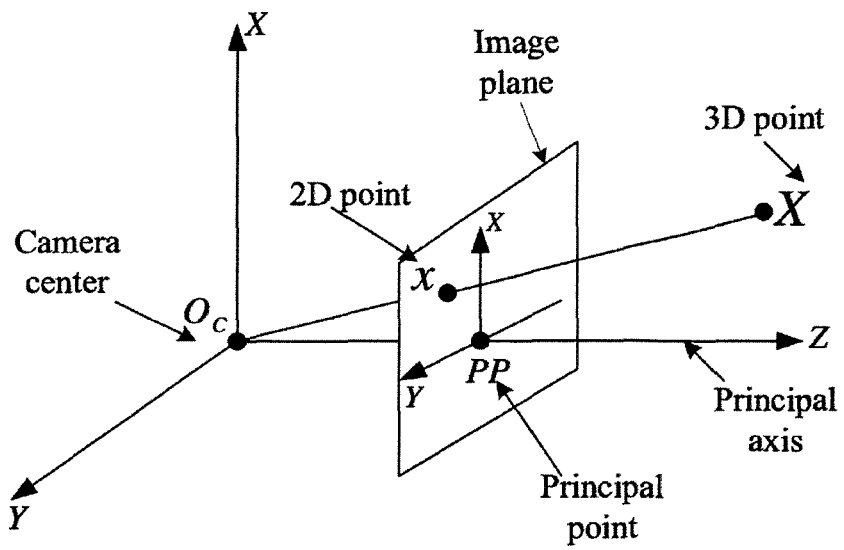
FIGS. 2A and 2B show various camera models according to one embodiment of the present disclosure.
Figure 2B:
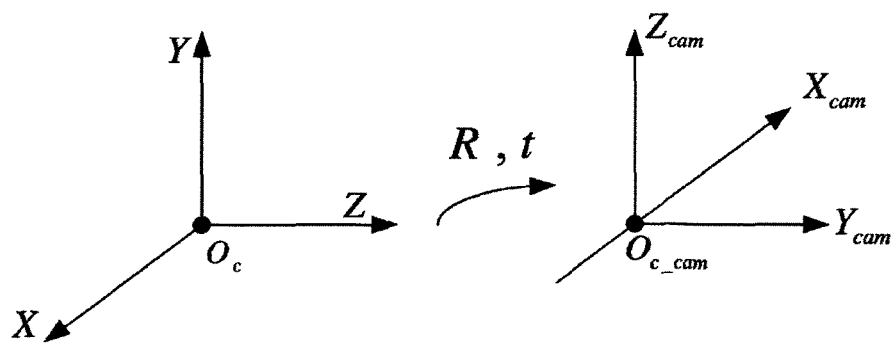

In stereo vision algorithms, the internal camera configurations and the relative poses of the stereo cameras are computed through the extrinsic parameters, such as a rotation matrix and translation vectors between the stereo cameras. In what is known as the pin-hole camera model, a 3×4 camera matrix can be represented using calibrated camera parameters. The pin-hole camera model is illustrated in FIG. 2. The camera matrix is represented as P=K[R|t], where R is a 3×3 rotation matrix representing the orientation of the camera coordinates with respect to the world coordinates, t is a 3×1 translation vector which shifts the camera center $O_C$ with respect to the world coordinate system. K is the intrinsic camera matrix, called the camera calibration matrix and is given by Equation (1):

$$K = \begin{bmatrix} f & s & u \\ 0 & \alpha f & v \\ 0 & 0 & 1 \end{bmatrix} \quad (1)$$

where f is the focal length of the camera, a is the aspect ratio of the pixel size on the image plane in the x and y directions, (u, v) represents the coordinates of the principal point with respect to the left bottom corner of the image plane, and s is the skew factor which is non-zero if the x and y axes of the image coordinates are not perpendicular.

The camera matrix P is essential for 3D depth estimation and 3D model reconstruction in machine vision theory, and it relates the coordinates of 2D points to the corresponding 3D points as shown in Equation (2):

$$x=PX \quad (2)$$

where x represents the 2D point in homogeneous representation, that is, it is a 3×1 dimensional vector. P is the 3×4 camera matrix also known as the projection matrix. X stands for the corresponding 3D point in homogeneous representation, and it is a 4×1 dimensional vector.

Figure 3:
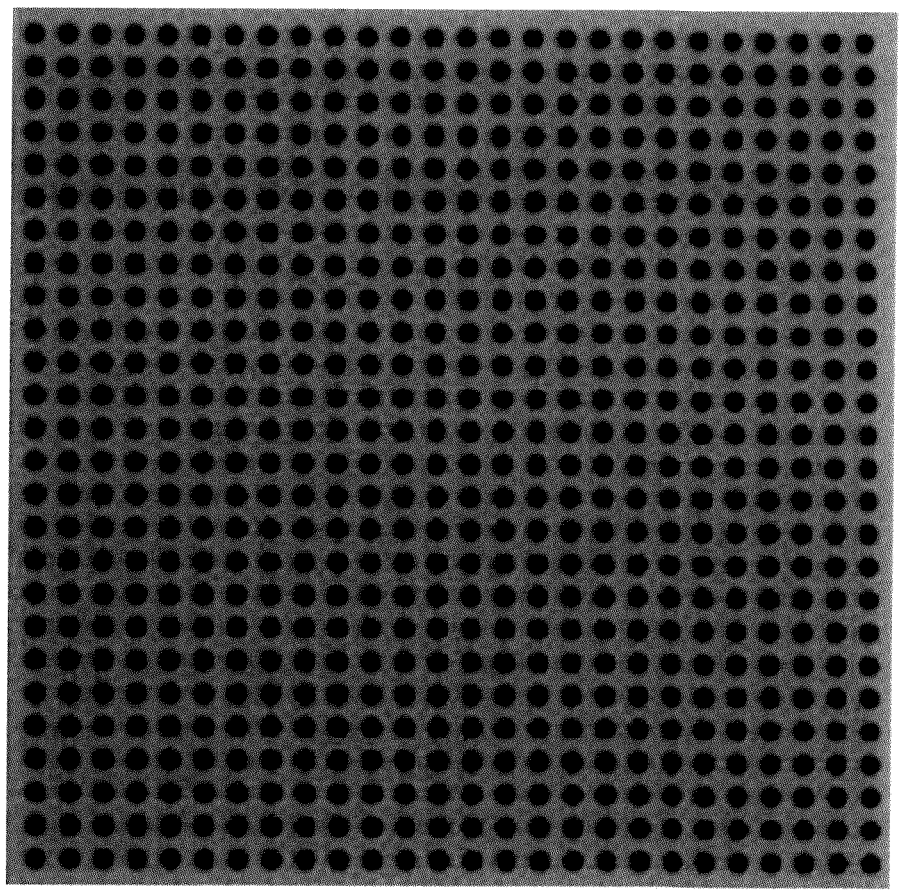
FIG. 3 shows a planar calibration pattern according to one embodiment of the present disclosure.

In order to estimate the camera matrices for the imaging setup 10 described above, a camera calibration method may make use of one or more available camera calibration tools (e.g., the MATLAB Camera Calibration Toolbox), which may compute a desired set of camera parameters from feature points of a planar calibration pattern in multiple views through a closed-form solution and a minimum mean-squared error (MSE) based nonlinear refinement procedure. One exemplary planar calibration pattern is shown in FIG. 3, as discussed in the article "Stereo Vision Based Automated Solder Ball Height and Substrate Coplanarity Inspection" by Jinjin Li, Bonnie L. Bennet, Lina J. Karam, and Jeff S. Pettinato, which can be found in the IEEE Transactions on Automation Science and Engineering, the disclosure of which is hereby incorporated by reference in its entirety. The small dark circles shown are printed on a ceramic board, are uniformly spaced, and the same size. In one embodiment, a total of 25 pairs of images may be captured with the calibration pattern board, which is placed in 25 different positions. For each position, a pair of images may be recorded using a first camera 12A and a second camera 12B in the imaging setup. The camera calibration is then implemented using the captured image pairs and any number of known stereo calibration methods to obtain the camera parameters of the first camera 12A and the second camera 12B.

Figure 4:
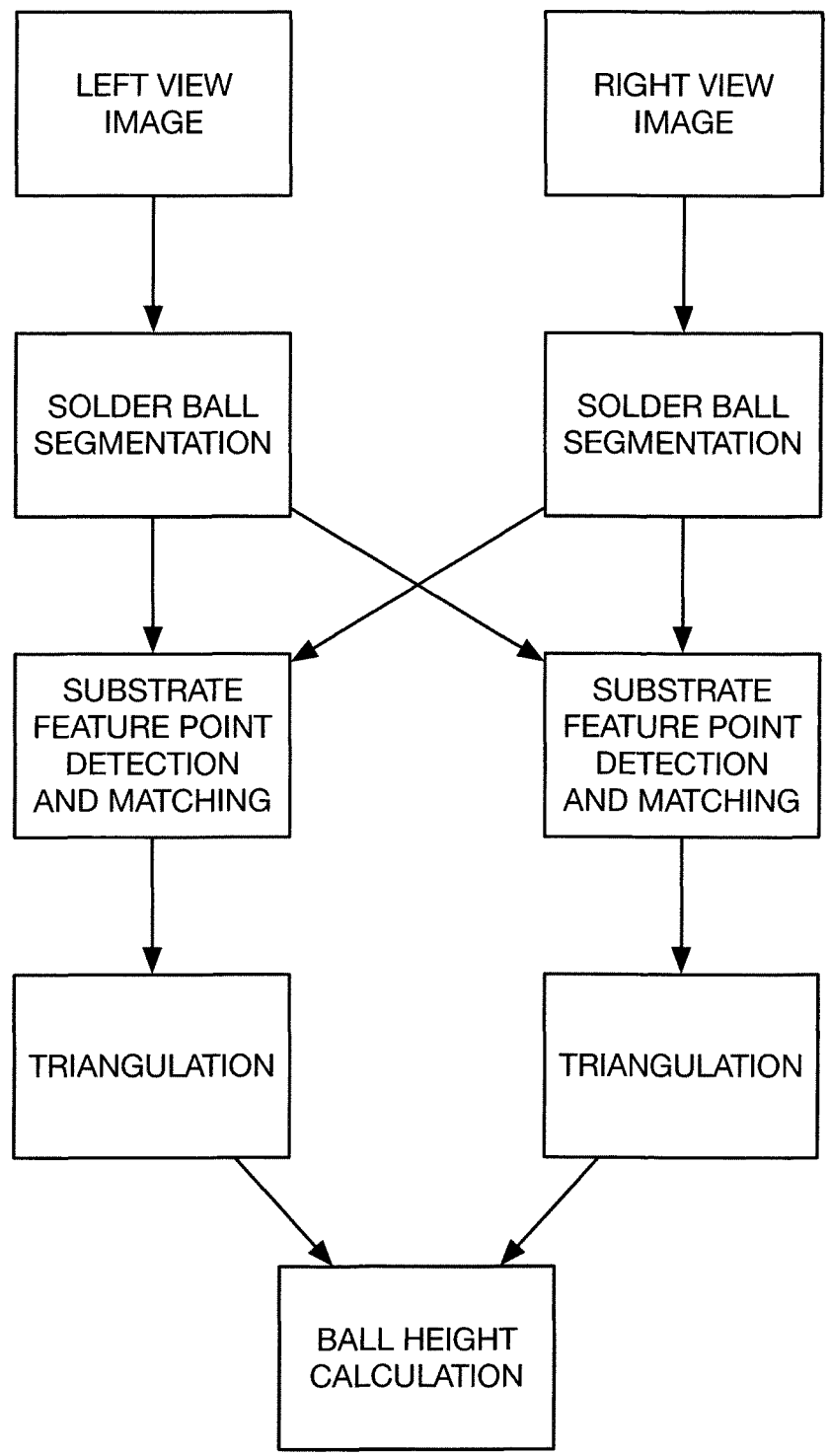
FIG. 4 is a flow chart illustrating a method for solder ball height inspection according to one embodiment of the present disclosure.

Once the imaging setup 10 has been provided and calibrated, the solder ball height and substrate coplanarity can be measured. FIG. 4 illustrates a method for solder ball height inspection and substrate coplanarity according to one embodiment of the present disclosure. FIG. 4 summarizes the steps of the solder ball height inspection and substrate coplanarity method including individual solder ball segmentation and matching, substrate feature point detection, solder ball peak feature point detection and matching, triangulation and solder ball height calculation and substrate coplanarity calculation. More details about ball segmentation, feature point matching, triangulation and coplanarity estimation are provided below.

Figure 5A:
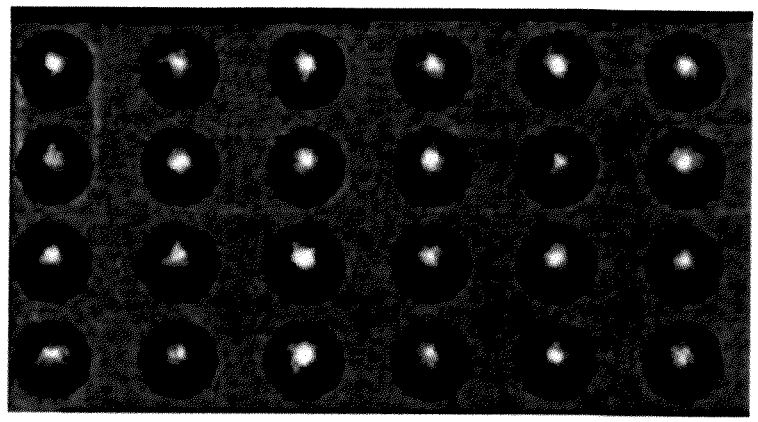
FIGS. 5A through 5C show images of an electronics package in various stages of evaluation according to one embodiment of the present disclosure.
Figure 5B:
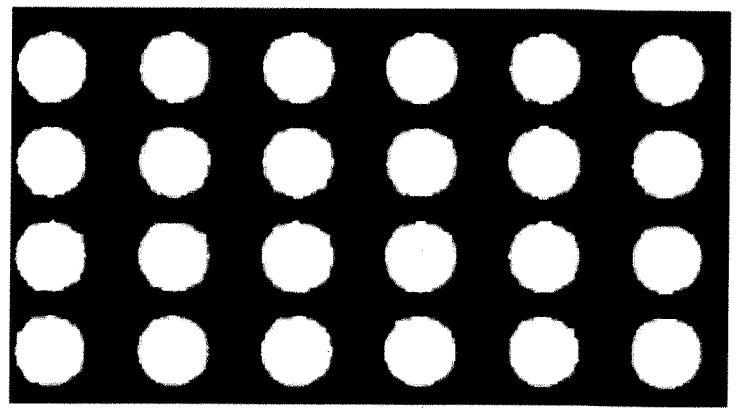

The accuracy of the matching process of solder ball feature points is one of the main factors that affect the accuracy of the final height results. In the feature matching process, the first basic step is to match the individual solder balls imaged from the first camera 12A and the second camera 12B correctly. As discussed herein, images from the first camera 12A may be referred to as "left view" images, while images from the second camera 12B may be referred as "right view" images. In order to properly match individual solder balls as discussed above, the individual solder balls are first segmented (i.e., separated from the substrate) and labeled in a row-wise order. Solder balls with the same label number in the images from the first camera 12A and the second camera 12B correspond to the same imaged solder ball. The segmentation of an electronics substrate separates two regions, namely, a solder ball region and a substrate region. In one embodiment, the segmentation method is an adaptive thresholding method based on histogram analysis, the details of which are well known to those of ordinary skill in the art. From the images captured by the cameras 12, the average gray-scale intensities of the substrate region and the solder ball region are different. The histogram of the image can be represented using two Gaussian distributions with different variance and different mean values. Using an automatic threshold calculation algorithm and morphological opening operations, the round-shape solder ball regions for each individual solder ball are segmented. The boundary of each individual solder ball mask is refined using circle fitting. An example of left view and right view images of a solder ball is shown in FIG. 5A, and the corresponding segmented ball mask is shown in FIG. 5B. In addition, for the same imaged physical ball, the highest intensity region containing or surrounding the ball peak occurs at different locations in the left and right views due to the opposite imaging angles of the first camera 12A and the second camera 12B, as shown in FIG. 6A. Accordingly, template matching is performed for each matching pair of solder balls, using the segmented solder ball in one view as the template, in order to correct for this deviation. The bright region aligned images in the left view and right view are shown in FIG. 6B. This alignment enables a more accurate matching of the locations of the corresponding ball peaks as described below.

After the balls are segmented and matched in the two camera views, solder ball peak points as well as substrate points need to be localized and matched in the left and right camera views in order to determine the heights of the solder balls. In order to measure the solder ball height, the goal is to find the bottom substrate point and the peak point of each solder ball from the features in the stereo 2D images. However, the main difficulty of the feature detection is that the surfaces of the solder balls are textureless and edgeless, which makes the popular feature detection algorithms, such as the Canny edge detector and the SIFT (Scale Invariant Feature Transform) generally unsuitable for finding the correct matching features. This is also the main reason why few stereo vision methods are used in the solder ball height inspection area.

Figure 5C:
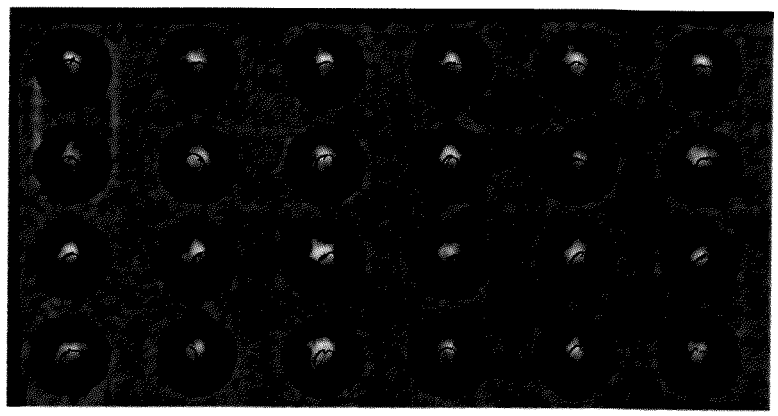

The bottom points of each solder ball are the points that lie on the same surface as the substrate. Since the solder balls are placed on the substrate using the paste or fluxing technique, the circle-shape boundary where each individual solder ball touches the substrate can be used to generate the bottom points for each solder ball. In the 2D image captured by the cameras 12, the boundary between a solder ball and the substrate surface is the solder ball mask boundary of the considered solder ball. For each individual solder ball, the centroid of the boundary points represents the imaginary point lying under the solder ball surface on the substrate surface. Thus, for each pair of matching solder balls in the stereo images, the solder ball mask boundary and its corresponding centroid are calculated for each solder ball in the pair. The computed centroid points corresponding to a matched solder ball pair in the left and right views are taken as the matched feature points on the substrate. The substrate feature points of the BGA image shown in FIG. 5A are plotted as the starred points shown in FIG. 5C.

Compared to the substrate feature point detection, the feature point detection and matching for solder ball peaks is more intricate. In one embodiment, the fact that, in the captured pair of images, the solder ball peaks should belong to areas of high intensities due to the employed imaging and lighting set-up as described above is exploited. The lighting generates intensity based features on the solder ball. According to the imaging setup discussed above, since the directional illumination and the area scan camera are placed at the same angle but on opposite sides, the solder ball peaks belong or are surrounded by bright regions in the captured image pair.

Figure 7A:
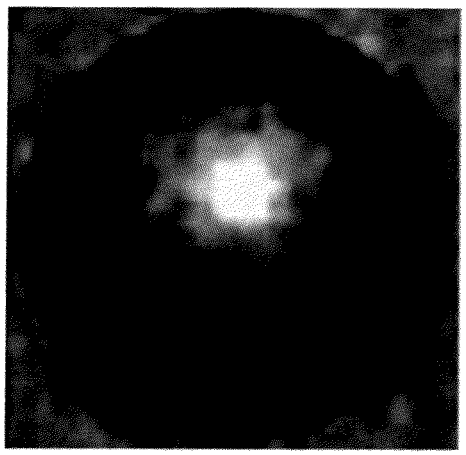
FIGS. 7A through 7C show different types of solder balls according to various embodiments of the present disclosure.
Figure 7B:
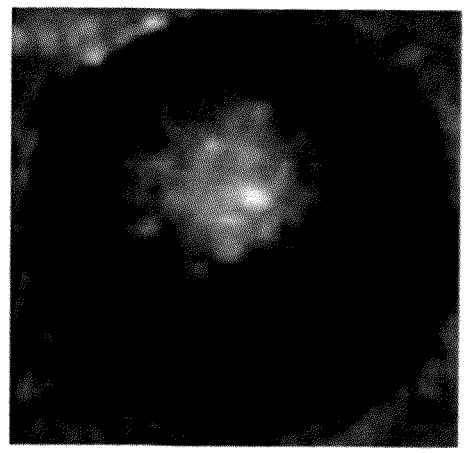
Figure 7C:
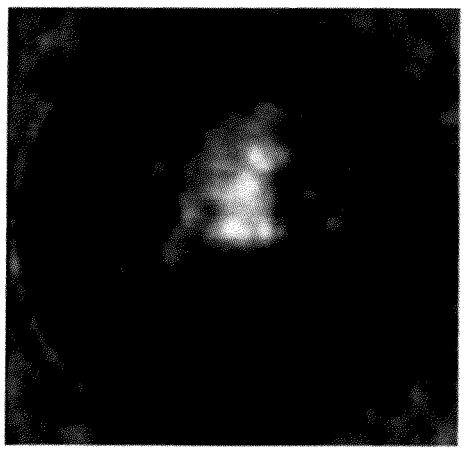

In real-world manufacturing environments, not all solder balls have ideal surfaces; some solder ball surfaces may be slightly scratched or worn off. Therefore, in order to account for this, there are several different types of solder ball surfaces that must be considered. FIG. 7 shows different types of solder ball surfaces with different reflective characteristics. In FIG. 7A, a normal solder ball surface exhibits a concentrated high-intensity round bright region around the solder ball peak. Another type of surface exhibits a bright region with a relatively lower intensity and larger diffused area than the one resulting from the normal surface, as shown in FIG. 7B. Some solder ball surfaces result in reflected bright intensities forming several separated distinct bright areas instead of a single bright region, as shown in FIG. 7C. In addition, the imaged surface of a solder ball results in different bright regions in the left and right view due to local variations in the reflective surface characteristics of the solder ball as shown in FIG. 10C1 and FIG. 10C2. Due to the difference in the formed bright regions in the two views and to the variations in the reflective surface characteristics of solder balls, a robust matching algorithm suitable for the different types of solder ball surfaces is needed. Accordingly, an iso-contour based matching algorithm is applied to detect the matching bright regions between stereo views.

Figure 8A:
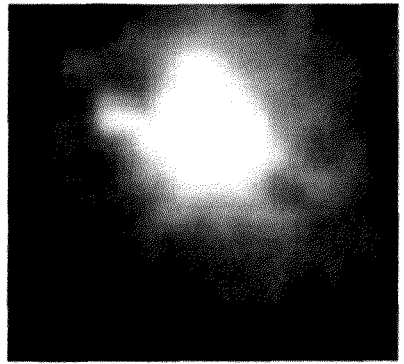
FIGS. 8A through 8C show various stages of evaluation of a top surface of a solder ball according to one embodiment of the present disclosure.
Figure 8B:
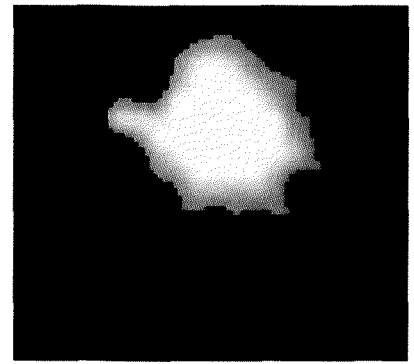
Figure 8C:
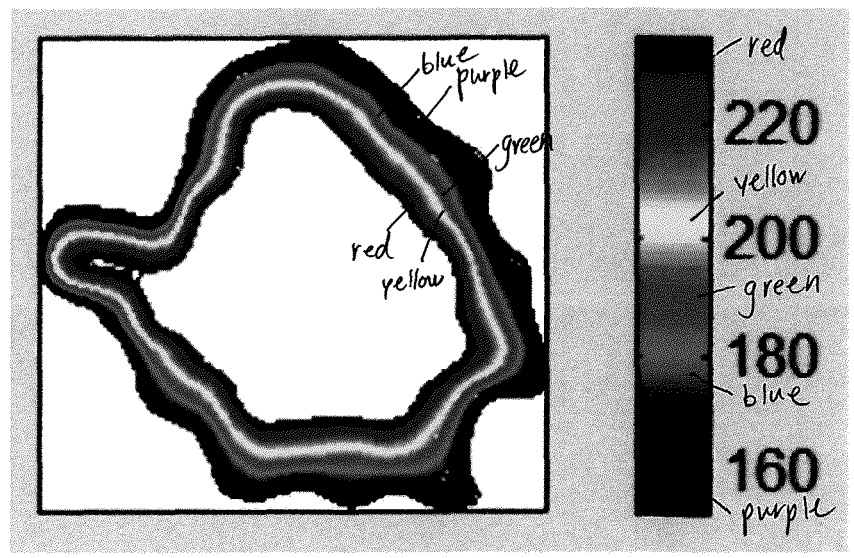

Points with the same intensity are determined on the solder ball surface and are grouped together to form curves of similar intensities, also known as iso-contours, which are then matched between the two views. For a given intensity, the iso-contour can be obtained by computing the locations of points having the considered intensity and connecting the located points together. In each individual solder ball region, multiple iso-contours are contained in a bright region intensity range. The lower threshold of the intensity range is determined using the adaptive thresholding method based on histogram analysis, and the higher threshold is the highest gray-scale level in the solder ball region. In order to obtain iso-contours with smooth curves, the discrete-domain image is transformed into an image on a fine dense grid approximating the continuous domain using bilinear interpolation. In this approach, the intensities of pixels at non-integer coordinates can be approximated from the surrounding pixels at integer coordinates, and the desired continuous iso-contour curves can be approximated. The iso-contours of various intensities in the bright region reflect the characteristic of the solder ball peak surface, such as the shape of the formed bright region and the structure of the bright region. The iso-contours inside a single concentrated bright region usually follow similar shapes as the bright region's boundary, and the iso-contours are nested from highest intensity to lowest intensity as shown in FIG. 8. FIG. 8C illustrates the iso-contours corresponding to the bright regions shown in FIG. 8B. In order to match the iso-contours in the left and right views, the iso-contours of each view are represented using a graph structure, which casts the iso-contour matching problem into a graph matching problem.

Figure 9A:
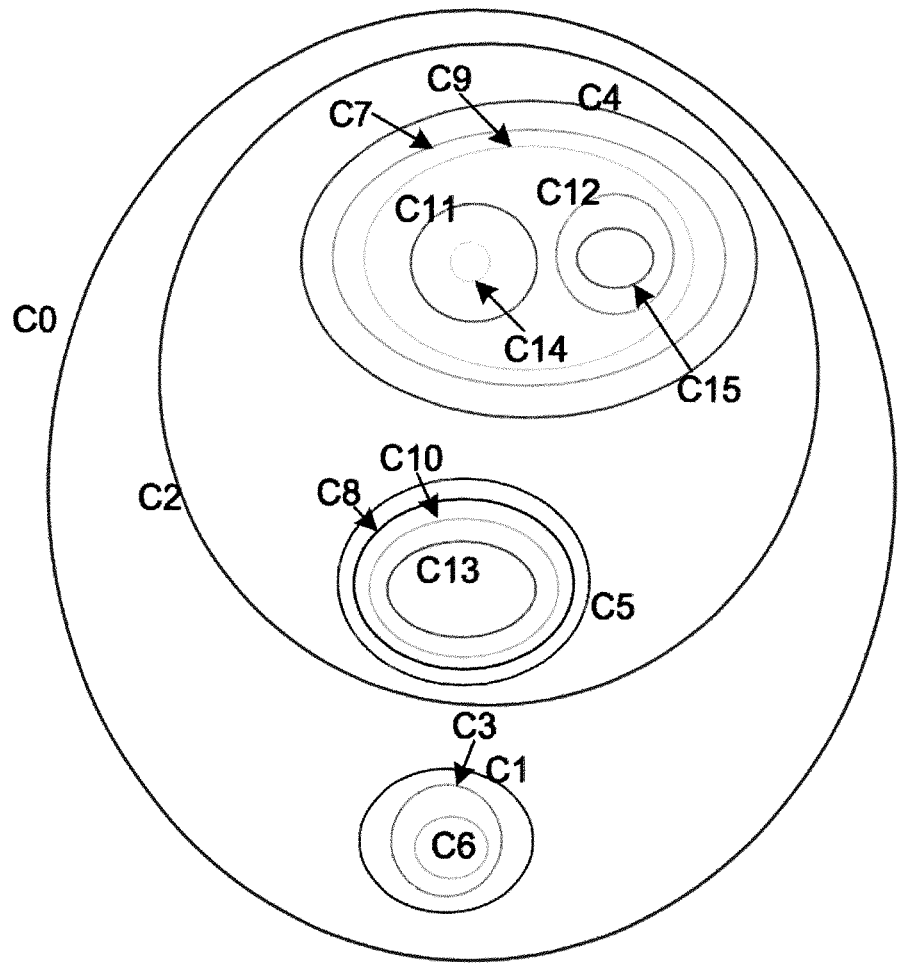
FIGS. 9A and 9B show a contour map and an inclusion tree of the contour map, respectively, representing a number of iso-contours on a top surface of a solder ball according to on embodiment of the present disclosure.
Figure 9B:
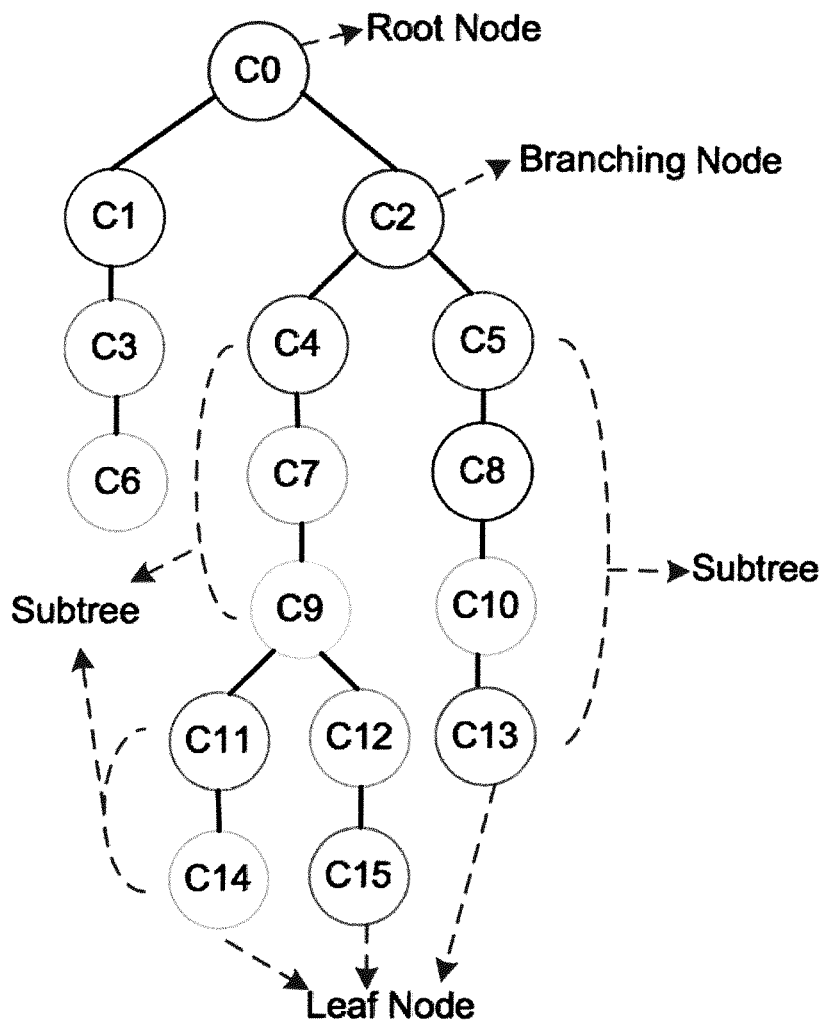

For a set of intensities ranging from a minimum value to a maximum value, the nesting relationship of iso-contours can be represented effectively using a tree graph structure, called an inclusion tree structure, as illustrated in FIG. 9. An iso-contour curve $c_1$ is defined as included inside another iso-contour curve $c_2$ if all the points along $c_1$ are located inside $c_2$. Equivalently, $c_2$ is said to enclose $c_1$. This inclusion relationship is defined mathematically as $c_1 \subset c_2$, if $c_1 \subset \text{Int}(c_2)$, where $\text{Int}(c_2)$ represents the interior region of the curve c according to the Jordan curve theorem. As shown in FIG. 9B, each contour curve corresponds to a node in the inclusion tree structure. The outermost iso-contour corresponds to the root node (for example, contour C0 in FIG. 9). A branching node in the tree structure corresponds to an iso-contour that encloses two or more non-nested iso-contours (for example, contour C2 and C9 in FIG. 9), and the resulting branches are called each a subtree. The end nodes of the tree structure, also known as leaf nodes, correspond each to an innermost iso-contour (for example, contour C6, C13, C14 and C15 in FIG. 9). FIG. 10 illustrates different types of bright regions and their associated iso-contours. For example, in FIG. 10A, there is a single contiguous bright region and its corresponding iso-contours can be represented using a tree with a single branch. FIGS. 10B through 10D illustrate cases when there are several distinct bright regions such that the associated iso-contours can be represented by a tree with multiple subtrees. In some cases, the number of subtrees representing the iso-contours in the left view can be different from the number of subtrees in the right view.

Once the tree structure is formed for each view, iso-contour matching starts by detecting and removing scattered outliers of sub-tree/tree regions in the bright regions of the left and right views. This outlier region removal is done by locating a bounding box of iso-contour region and removing scattered bright regions near the bounding box. The bounding box of the bright region is determined as the bounding box of the root iso-contours with relatively large areas. If there is only one iso-contour in the root node of the tree structure, the bounding box is the bounding box of the root iso-contour. If multiple separate iso-contours exist at the root node level of the tree structure, the areas of each of these iso-contours are sorted in descending order, and the area ratio of the $j^{th}$ area over the $(j+1)^{th}$ area is calculated. The first index of the area ratio that is larger than a threshold of 2 is detected, and all iso-contours in the sorted array before the threshold index are used to compute the rectangular bounding box enclosing these iso-contours. Once the bounding box of the bright region is detected, for each sub-tree/tree region, the distance between the centroid of the outermost contour and the centroid of the bounding box is calculated, and the sub-trees/trees regions that result in a distance that is greater than twice the standard deviation of all the computed distances are removed as outliers. This ensures the removal of the scattered bright regions with small areas.

After the removal of the outliers scattered bright regions, for each subtree/tree region in one view, a matching subtree/tree region is localized in the other view, and matching feature points are computed from the matching subtree/tree regions. A flowchart in FIG. 11 shows the main steps of the matching procedure. For each subtree/single-branch tree in the left view, referred to as reference subtree/tree, a set of candidate matching subtrees/single-branch trees in the right view is formed. The set of matching candidates is formed based on three features: the overlap ratio between the areas covered by the outermost contour of the considered subtree/tree in the left view and the candidate subtree/tree in the right view, the area difference and the centroid distance of the outermost iso-contour of the considered subtree/tree in the left view and the candidate subtree/single-branch tree in the right view. The right-view subtrees/single-branch trees with the largest overlap ratio, the smallest area difference or smallest centroid distance are selected as matching candidates. As a consequence, for each subtree/single-branch tree in the left view, there are at least one matching candidate and at most three matching candidates in the right view. If the formed set of candidates contains all the subtrees of a tree, an additional candidate representing the whole tree is also included as part of the formed candidate set.

Once the matching candidates of the subtree/tree region are formed, the next step is to locate the matching solder ball peak feature points in the matching subtree/tree regions in the left and right views. For this purpose, for each candidate matching pair of subtree/tree regions between the left and right view, the iso-contour with the largest average intensity gradient magnitude values in each view is chosen as the candidate matching iso-contour curve, and the centroid points of the matching iso-contours in both views are calculated as a candidate matching pair of feature points. Among the matching candidate feature point set, the best matching subtree/tree region is determined using epipolar geometry between their relative locations. The details of epipolar geometry will be discussed below. The epipolar constraint between two corresponding 2D feature points $x_1$ and $x_2$ is represented using the fundamental matrix F as $x_2^T F x_1 = 0$. Due to the presence of noise and pixel quantization error, the detected feature points may not satisfy the epipolar constraint. While fixing the feature point in the left view, the nearest point to the original feature point in the right view which satisfies the epipolar constraint can be located. The Euclidean distance of the corrected point and the original feature point in the right view can be used as a measure of the quality of the original matching feature points. If a pair of candidate matching points results in a large Euclidean distance for the corrected point, the candidate matching is problematic. For each subtree/single branch tree of the left view, among the candidate matching feature points in the right view, the matching feature point that results in the smallest corrected Euclidean distance is chosen as the best matching feature point, and the corresponding matching subtree/tree region is selected as the best matching subtree/tree region.

For multiple pairs of matching subtrees/trees, the corresponding multiple pairs of centroid points are used as the matching feature points for the considered ball peak between the left view and right view. An example of the matching iso-contour curves and centroids for multiple matching bright regions are shown in FIG. 12. These multiple pairs of centroid points are further used to calculate candidate ball height using triangulation as discussed in Section C. For a given solder ball, candidate solder ball heights that deviate from other solder ball height values by twice of the standard deviation are eliminated, and the ball height value with the smallest corrected point distance among the remaining candidate ball heights is selected as the final solder ball height.

Once the corresponding feature points of substrate and solder ball peak are located in the stereo images, the triangulation method is used to obtain the 3D reconstruction of these feature points, as illustrated in FIG. 13. Ideally, in 3D space, the intersection of two lines, which are formed by connecting each of a set of matching 2D points and their corresponding camera centers, can be computed to get the corresponding 3D point in space. But due to the presence of noise and digitization errors, it is possible that the intersection of these two rays does not exist in the 3D space. Epipolar-based optimized triangulation is applied to the matched pair of feature points in order to calculate the coordinates of the corresponding 3D points.

In 3D machine vision theory, the epipole of one view is the intersection point between the image plane of the considered view and the line connecting the centers of the two cameras corresponding to each of the two views, as illustrated in FIG. 13. The line that connects the 2D image point (projection of considered 3D point on image plane) and the epipole in the same view, is called the epipolar line. Epipolar geometry states that any pair of matching points where one point of the pair is in the left and the other is in the right view must lie on a pair of corresponding epipolar lines in the left and right view, respectively. Further, any pair of matching points lying on these two lines satisfies the epipolar constraint. The epipolar constraint between two corresponding 2D feature points $x_1$ and $x_1$ is represented using the fundamental matrix F as $x_2^T F x_1 = 0$. The fundamental matrix F can be computed from the camera projection matrices of the two cameras 12. Using the corresponding 2D feature points that satisfy the epipolar constraint, the 3D point that corresponds to the matching 2D feature points in the stereo views can be computed using linear triangulation according to x=PX.

As the feature points are detected in the images according to local iso-contour information, the detected matching feature points might not satisfy the epipolar constraints between the stereo views due to noise and digitization error. In linear triangulation, the 3D points calculated using the 2D feature points that do not satisfy epipolar constraints will be inaccurate. Thus a corrected set of 2D matching feature points satisfying the epipolar constraint needs to be calculated near the original 2D feature points detected in images. Accordingly, an MSE-based method may be used to localize a pair of corrected 2D feature points $\hat{x}_L$ and $\hat{x}_R$ that minimize the Euclidean distance between the corrected points and the original noisy 2D points $x_L$ and $x_R$ in two views, which can be represented mathematically as shown in Equation (3):

$$\min d(x_L, \hat{x}_L)^2 + d(x_R, \hat{x}_R)^2 \text{ subject to } \hat{x}_R F \hat{x}_L = 0 \quad (3)$$

According to epipolar geometry, any pair of corrected points satisfying the epipolar constraint must lie on a pair of corresponding epipolar lines in the two images. Alternatively, any pair of points lying on the corresponding epipolar lines will satisfy the epipolar constraint. Thus localizing corrected 2D points which minimize the Euclidean distance from the original points is equivalent to localizing a pair of corrected epipolar lines in both views that minimize the Euclidean distance between the original 2D points and the corrected epipolar lines in both views. This can be represented as shown in Equation (4)

$$\min d(x_L, \hat{l}_L)^2 + d(x_R, \hat{l}_R)^2 \quad (4)$$

where $\hat{l}_L$ and $\hat{l}_R$ are the corrected epipolar lines satisfying the epipolar constraint. In order to minimize Equation (4), first the corrected epipolar line in the left view is parameterized using a parameter t and the epipole $e_L$ calculated using the fundamental matrix F. Thus the epipolar line in the left view can be written as $\hat{l}_L(t)$. Second, using the fundamental matrix F, the corresponding epipolar line in the right view can be computed as $\hat{l}_R(t)$. Third, the distance function in Equation (4) can be expressed as a polynomial function of t, represented as g(t). By computing the roots of the numerator polynomial of the solution of the parameter is the root value, which minimizes the polynomial function in Equation (4). Finally, using the calculated parameter t, a pair of corrected epipolar lines are solved for. In each view, the intersection point between the corrected epipolar line and the line going through the original 2D point and perpendicular to the corrected epipolar line is the corrected 2D feature point.

In one embodiment, a simplified method to compute a corrected set of 2D feature points is used. Instead of computing a pair of corrected points near the original ones, the feature point in one view is fixed, and a corrected feature point in the other view near the original one is calculated. In order to locate the corrected set of 2D matching feature points at the sub-pixel level, both the left-view and right-view images are interpolated by an integer factor of 4 before feature point detection and matching. The goal of the optimized triangulation method is to fix the original 2D feature point in one view (left view), and to localize a corrected 2D feature points that minimizes the Euclidean distance between the corrected points and the original noisy 2D points, in the other view (right view), which can be represented mathematically as $$\min d(x_R, \hat{x}_R)^2 \text{ subject to } \hat{x}_R F \hat{x}_L = 0 \quad (5)$$

Since the feature point in the left view is fixed, the corresponding epipolar line in the right view can be calculated using the feature point in the left view and fundamental matrix, as $l_R = F x_L$. The corrected point in the right view that minimizes the distance in Equation (5) is the intersection point between the epipolar line and the line going through original 2D point and perpendicular to the epipolar line. The corrected pair of 2D feature points satisfies the epipolar constraint, and the intersection of the projected lines of 2D points in 3D space is ensured. Using the corrected matching feature points in both views and the calibrated camera projection matrix, the coordinates of the 3D point corresponding to the matched 2D points in the left and right images are computed using linear triangulation based on singular value decomposition (SVD). The Euclidean distance in Equation (5) also reflects the accuracy of the matching between the original 2D feature points. If the corrected Euclidean distance is large, the original matching pair of feature points is problematic. Thus this corrected Euclidean distance is used as indicated in herein to determine the best matching among multiple candidate matching sub-trees or single branch trees.

For each individual solder ball, the 3D point of the bottom of the solder ball on the substrate and the 3D points of solder ball peaks are calculated through triangulation. The Euclidean distance between the coordinates of each 3D solder ball peak point and corresponding 3D solder ball bottom point is calculated as the solder ball height value. As indicated above, for a given solder ball, it is possible to obtain multiple best matching pairs of solder ball peak subtree/tree regions. In this latter case, for the considered solder ball, multiple 3D solder ball peak points and corresponding solder ball heights are calculated, one for each best matching pair. Solder ball heights that deviate from other solder ball height values by twice of the standard deviation are eliminated, and the solder ball height value with the smallest corrected point distance in the remaining solder ball heights is selected as the solder ball height.

The coplanarity of the substrate is used to evaluate the warpage of the substrate surface. In one embodiment, coplanarity is calculated using the depth of substrate points corresponding to each individual solder ball, by finding a rotation matrix and a translation vector that transform the substrate 3D points from the coordinate system of the left camera (with the origin point located at the camera center) to the coordinate system of the electronics package (with the origin point located at the top left corner point of the image package area), the depth values of the transformed substrate 3D points correspond to the coplanarity values of the substrate. According to three-dimensional machine vision theory and to in light of the camera calibration method used for the cameras 12, given the calibrated intrinsic camera matrix of the left camera, the 2D image points of a planar pattern on the left camera image plane and the 3D points that correspond to the same physical planar pattern with respect to the BGA package's coordinate system, the homography between 2D planar image points and planar 3D points can be calculated, and the rotation matrix and translation vector are computed by decomposing the obtained homography matrix.

First, a set of 3D planar points in the 3D space are formed, and the 3D coordinates of these points, $x_C$ and $x_P$ with respect to both the left camera's coordinate system and BGA package's coordinate system are obtained, respectively. Then, using the projection matrix of the left camera, $P_L$, and the 3D planar point's coordinates $X_C$ with respect to the left camera's coordinate system, a set of 2D planar image points $x_C$ on the left camera's image plane can be computed. Finally, the rotation matrix and translation vector can be computed using the 2D planar image points $x_C$ and the set of corresponding 3D planar points' coordinates $X_P$ in the coordinate system of the electronics package as described in more details below.

The procedure for warpage detection and quantification may include first calculating the 3D point of the ball bottom on the substrate and the 3D points of ball peaks for each individual solder ball through triangulation. The obtained 3D substrate points calculated with respect to the left-view camera (denoted as $X_{C_{substrate}}$) may not lie on the same plane due to warpage. In order to detect and quantify this warpage, a reference plane, with respect to which warpage is measured, needs to be determined. For this purpose, the coordinates (with respect to the left-view camera's coordinate system) of three boundary 3D substrate points in the imaged electronics package are used to form a plane. In one embodiment, the top-left, top-right and bottom-left boundary 3D substrate points are chosen for the plane calculation. All other 3D substrate points are projected on this plane resulting each in a projected 3D point with the same x and y coordinates but with a z-coordinate (depth value) that is determined from the plane equation. Thus a set of 3D planar points $X_C$ with respect to the left camera's coordinate system is formed using 3 boundary substrate points and all other projected 3D substrate points lying on the plane.

The x and y coordinates of 3D planar points $X_P$ with respect to the electronics package are formed using the same x and y coordinates of $X_C$, and the z values are defined to be 0. Next, the 2D image points on the left-view camera's image plane corresponding to the 3D planar points $X_C$ are calculated using the left-view camera's projection matrix $P_C$ as $x_C = P_L X_C$, where $P_L = K_L [I, \overline{0}]$, $K_L$ is the camera intrinsic matrix, I is a 3×3 identity matrix, and $\overline{0}$ is a 3×1 column vector with all zero elements. Finally, the 3×3 homography H between $x_C$ and $X_P$ is computed using a Direct Linear Transform (DLT) method, and $x_C = H X_P$. The rotation matrix R and translation vector t is computed by decomposing H. Once R and t are obtained, the 3D substrate points $X_{C_{substrate}}$ are calculated using triangulation with respect to the left camera's coordinate system, are transformed to 3D substrate points $X_{C_{package}}$ with respect to the BGA package's coordinate system, as $X_{C_{package}} = R^T X_{C_{substrate}} - R^T t$. The origin point of the BGA package's coordinate system is taken to be the top-left corner point of the imaged solder ball package region in some embodiments. The depth values (z-coordinate value) of the transformed 3D substrate points corresponding to each solder ball represent the coplanarity of the BGA substrate.

The techniques described above have been applied to different Intel product lines, referred to herein as product (A), product (B), and product (C). Each one of these product lines has different solder ball layout and different ball characteristics. The average solder ball height for products (A), (B), and (C) are around 280 um, 280 um and 380 um respectively. Example images of solder balls, one from each of the three products, are shown in FIG. 14.

In order to evaluate the performance of the techniques discussed above, the solder ball height and coplanarity results of the proposed algorithm were analyzed through the measurement capability analysis (MCA) procedure. The MCA procedure includes of three different aspects to prove that the proposed metrology is accurate, capable and stable under important parameters. These three analyses are accuracy, repeatability and reproducibility, and for each analysis, there is a standard evaluation metric to determine the capability of the metrology. The MCA procedure is conducted on both the solder ball height and substrate coplanarity results, and details are described below.

In the MCA procedure, the solder ball height and substrate coplanarity results of the techniques discussed herein are compared with those collected using two existing automated inspection tools: a laser-scanning tool and a confocal inspection tool. The laser-scanning tool scans the entire solder ball surface for each solder ball to calculate the true solder ball height. However, the laser scanning process is time-consuming and is not suitable to measure all the testing solder ball samples due to the considerable amount of time it takes to profile each solder ball. Furthermore, laser-scanning does not provide a measure of coplanarity. As a consequence, in the present MCA analysis, the solder ball height accuracy of the proposed method is compared with the solder ball height of the laser-scanning tool on a limited number of solder balls.

On the other hand, the existing confocal inspection tool is able to profile the electronics packages off-line in a shorter amount of time than the laser scanning tool, and can provide both solder ball height and substrate coplanarity results in multiple measurements. However, the confocal tool determines the solder ball height using circle-fitting techniques for solder ball peak detection, thus the obtained solder ball height values may not correspond to the true solder ball height. A detailed correlation analysis between the confocal tool solder ball height and laser-scanning solder ball height is presented below, and shows that the confocal tool does not correlate well with the highly accurate laser scanning tool. As a consequence, the solder ball height of the laser scanning tool is used as a reference for establishing the high accuracy of the solder ball height obtained using the proposed method, while the solder ball height of the confocal tool is used for establishing the high repeatability of the proposed method. In addition, the coplanarity results of the confocal tool are used for establishing the high accuracy and repeatability of the techniques discussed herein for coplanarity measurement and warpage detection.

For solder balls in one row on the electronics package, the depth values of substrate and the depth values of solder ball peak feature points with respect to the left-view camera's coordinate system are plotted in FIG. 15A. Since both cameras are placed over the electronics package, the substrate depth values are larger (greater distance from the camera) than the solder ball peak depth values (lesser distance from the camera) when viewed from the left camera center. The solder ball height is obtained by calculating the Euclidean distance between the substrate 3D point and the ball peak 3D point. The solder ball height values of solder balls are plotted in a row-wise order, as shown in FIG. 15B.

In the accuracy analysis of the MCA procedure, the solder ball height results calculated using the techniques discussed herein are compared with the solder ball height results of laser-scanning inspection tool on product (C) for a number of solder balls. This is because product (C) usually produces more variance and inaccuracy in solder ball height than the other two products, and if the accuracy of product (C) is capable, it also proves the capability of the other two products. The evaluation metric of accuracy analysis is the R-squared value, which is the square of the correlation between two comparison results. If the R-squared value of the solder ball height between the proposed method and laser-scanning tool is larger than 0.75, the proposed method is accurate for automated inspection. The correlation and solder ball height difference results of the solder ball height values between the proposed method and laser-scanning tool are shown in FIG. 16. Using statistics analysis software (e.g., JMP 7.0), the correlation value can be calculated as 0.94 and the R-squared can be calculated as 0.8853, indicating that the techniques discussed herein not only satisfy but significantly exceed the accuracy criterion. On the other hand, since the confocal tool uses circle-fitting techniques on the solder ball surface peak detection, the solder ball height detected by the confocal tool does not reflect the true solder ball height. In fact, the correlation of solder ball height between the confocal tool and the laser-scanning tool is 0.3, which does not prove high accuracy. This is the reason why the solder ball height of the proposed method is compared with that of the laser-scanning tool for accuracy analysis.

In the repeatability analysis of the MCA procedure, the solder ball height results calculated using the proposed method are compared with the solder ball height results of the confocal inspection tool on all three products due to the established high-repeatability of the confocal tool. The objective of repeatability testing is to determine whether the tool's "inherent" variation is acceptable and stable in the short term.

For each product, an electronics package is randomly picked and imaged a number of times (e.g., 30 times). In the repeated measurements, the electronics package is picked-up and re-fixtured in a short time on the same day. The total numbers of solder balls tested on the package of each of products (A), (B) and (C) are 76, 151 and 156, respectively. The evaluation metric of repeatability analysis is the P/T ratio, which is represented as shown in Equation (6):

$$\frac{P}{T} = \frac{6\sigma_{ms}}{USL - LSL} \times 100\% \quad (6)$$

where $\sigma_{ms}$ is the mean variance of a number of solder ball heights (e.g., 30) of each solder ball among all solder balls measured, and USL−LSL is the tolerance range of the solder ball height in the pre-defined spec limits. The tolerance range of product (A) and (B) is 100 μm, and of product (C) is 120 μm. If the P/T ratio is below 20%, the repeatability of the proposed method is proved. The solder ball height results for the tested solder balls in 30 measurements of the techniques described herein and the confocal method are plotted in row order in FIG. 17. The mean variance values $\sigma_{ms}$ of product (A), (B) and (C) are 1.31 um, 1.67 um and 1.58 um, respectively. Using Equation (6), the P/T ratio values of the techniques described herein on products (A), (B), and (C) are 7.9%, 10% and 7.91% respectively. The P/T ratio values of the confocal method on products (A), (B), and (C) are 5.5%, 7.6% and 8%. Both the techniques described herein and the confocal method have the P/T ratio well under 20%, and this proves the repeatability of the present techniques.

In the reproducibility analysis of the MCA procedure, the solder ball height results calculated using the techniques described herein are analyzed on different products under different affecting factors. The objective of reproducibility testing is to determine whether the total measurement variation is acceptable under different metrology factors. In the reproducibility testing of ball height detection method, three major affecting factors are tested: day, rotation and translation of an electronics package in the field of view, each of which is repeated. The testing plan includes 2 different products, products (A) and (C), a number of balls on each product (e.g., 40), a number of days (e.g., 3 days), a number of rotated and shifted package locations in the camera field of view (e.g., 3 rotations and shifts), and a number of repeats for each placement (e.g., 3 repeats). Thus for each solder ball on each product, a large number of measurements are taken and tested (e.g., 27 measurements). The evaluation metric of reproducibility analysis is the P/T ratio, and if the P/T ratio is smaller than 30% in reproducibility testing, the proposed automatic tool is capable. The solder ball height results for the tested solder balls of product (C) in 27 measurements of the techniques discussed herein are plotted in row order in FIG. 18. The mean variance values $\sigma_{ms}$ of product (A) and product (C) are 1.94 um and 1.90 um, respectively. The P/T ratio value of the proposed method on products (A) and (C) are 11.6% and 9.5%, respectively, which are significantly lower than the threshold of 30%. Thus the reproducibility analysis of the techniques discussed herein meets and exceeds the reproducibility criterion.

From the above three MCA procedures on the techniques discussed herein, the accuracy and stability of the techniques are proved, showing that the techniques are able to be used as an automated ball height detection tool.

The coplanarity of the electronics substrate is used to evaluate the warpage of the substrate surface. In the considered electronics package coordinate system, the depth values of the substrate point represent the coplanarity of the package.

A 3D plot of the 3D substrate points over 4 solder ball rows on the package for products (A), (B), and (C) are shown in FIG. 19A through FIG. 19C using the techniques described herein (dot). For comparison, FIG. 19A through FIG. 19C also show the 3D substrate points obtained using the confocal tool (star). The 3D substrate points are plotted in FIG. 19 with respect to the electronics package's coordinate system (with the origin point located at the top left corner point of the image package area). As seen in FIG. 19, the depth values of the solder ball substrate points are following a curved-shape plot, which reflects the warpage of the electronics package.

Similar to the MCA on solder ball height, an MCA procedure including accuracy, repeatability and reproducibility was tested on the coplanarity results, and compared with the confocal coplanarity results. In the accuracy analysis, the proposed method is tested on product (A) with a number of solder balls (e.g., 76 solder balls), product (B) with a number of solder balls (e.g., 151 solder balls) and product (C) with a number of solder balls (e.g., 156 solder balls). The correlation and difference results in terms of coplanarity values between the proposed method and the confocal tool are shown in FIG. 20 for product (C). The correlation values for coplanarity between the proposed method and the confocal tool on products (A), (B), and (C) are 0.984, 0.979 and 0.985, respectively. Thus the R-squared values for products (A), (B), and (C) are 0.9692, 0.9583 and 0.9701, respectively. Since the R-squared values for all three products are significantly larger than the threshold 0.75, the accuracy of the techniques described herein is proved.

In the repeatability analysis, the techniques described herein are tested on the same electronics packages and solder balls as those used for the coplanarity accuracy analysis, and repeated for a number of measurements (e.g., 30 measurements) in a short time on the same day. The coplanarity results for the tested solder balls of product (C) corresponding to 30 measurements using the proposed method and the confocal method are plotted in row order in FIG. 21. The mean variance values $\sigma_{ms}$ of products (A), (B), and (C) are 0.8 um, 1.08 um and 0.61 um, respectively. The P/T ratio values on products (A), (B), and (C) are 4.8%, 6.4% and 3%, respectively, for the proposed method, and the P/T ratio values of the confocal method is 5.5%, 7.6% and 8% respectively. For coplanarity repeatability, the P/T ratio of the proposed method is lower than that of the confocal tool. Since all the P/T ratios are significantly less than the threshold 20%, the high repeatability of the proposed coplanarity method is established.

The reproducibility analysis on the coplanarity results are tested with the same plan as that of the reproducibility analysis on the solder ball height results. The coplanarity results for the tested solder balls on product (C) corresponding to 27 measurements using the proposed method are plotted in row order in FIG. 22. The mean variance values $\sigma_{ms}$ of products (A) and (C) are 0.82 um and 1.36 um, respectively. The PIT ratio values on products (A) and (C) using the proposed method are 4.9% and 6.8%, respectively, which are all significantly less than the threshold 30%. Thus the reproducibility of the proposed coplanarity method is validated.

The iso-contour stereo vision image analysis techniques discussed above may be implemented by an image processing system 24, the details of which are shown in FIG. 23. The image processing system 24 includes the imaging setup 10 shown above in FIG. 1, and an imaging processor 26. The imaging processor 26 may include a memory 28, a processor 30, and communications circuitry 32 coupled to the imaging setup 10. The communications circuitry 32 may retrieve stereo images from the imaging setup 10 for processing, and further may provide commands to the imaging setup 10 in order to obtain the stereo images and operate other aspects thereof. The memory 34 may store instructions, which, when executed by the processor 36, carry out the iso-contour stereo vision image analysis techniques discussed above in order to determine a solder ball height and a substrate coplanarity of an electronics package.

FIG. 24 is a flow chart illustrating a method of operating the image processing system 24 shown in FIG. 23 according to one embodiment of the present disclosure. First, a number of stereo images are obtained from the imaging system 10, which includes the pair of cameras 12 positioned such that each stereo image includes a left view and a right view of an electronics package (step 100). Each one of a number of solder balls on the electronics package are then visually segmented from a substrate of the electronics package (step 102). For each one of the left view and the right view, a number of points within each one of the solder balls are then grouped based on the intensity of light reflected therefrom in order to form iso-contours (step 104). The iso-contours formed for the right view and the left view are then matched to one another to form a number of matched iso-contours (step 106). A triangulation is then performed to determine the height of each one of the solder balls and the coplanarity of the substrate (step 108).

Those skilled in the art will recognize improvements and modifications to the preferred embodiments of the present disclosure. All such improvements and modifications are considered within the scope of the concepts disclosed herein and the claims that follow.

What is claimed is:

1. A method of operating an imaging processor in an image processing system comprising:
   obtaining at least one stereo image from an imaging setup in the image processing system, wherein the at least one stereo image includes a left view and a right view of an electronics package including a substrate and a plurality of solder balls on a surface of the substrate such that each one of the left view and the right view are obtained from separate cameras located at opposite angles with respect to the electronics package;
   for each one of the left view and the right view, grouping a number of points on a surface of each one of the plurality of solder balls together based on the intensity of light reflected from the particular point and connecting the grouped points together in order to form a plurality of iso-contours;
   visually segmenting the plurality of solder balls from the substrate such that a solder ball mask is generated, which includes a plurality of solder ball mask boundaries that delineate a boundary of each one of the plurality of solder balls with respect to the surface of the substrate;
   calculating a centroid of each one of the plurality of solder ball mask boundaries; and
   matching each one of the plurality of iso-contours in the right view to a corresponding iso-contour in the left view to form a plurality of matched iso-contours, wherein the matching comprises:
     organizing nested iso-contours from each one of the right view and the left view into respective inclusion tree structures;

removing outliers from each one of the inclusion tree structures; and matching branches of the inclusion tree structures to one another based on a relationship between nodes in the inclusion tree structures.

2. An imaging processor for use in an image processing system, the imaging processor comprising:

a processor;

communications circuitry;

a memory storing instructions which, when executed by the processor, cause the imaging processor to:

obtain at least one stereo image from an imaging setup in the image processing system, wherein the at least one stereo image includes a left view and a right view of an electronics package including a substrate and a plurality of solder balls on a surface of the substrate such that each one of the left view and the right view are obtained from separate cameras located at opposite angles with respect to the electronics package;

for each one of the left view and the right view, group a number of points on a surface of each one of the plurality of solder balls together based on the intensity of light reflected from the particular point and connecting the grouped points together in order to form a plurality of iso-contours;

visually segment the plurality of solder balls from the substrate such that a solder ball mask is generated, which includes a plurality of solder ball mask boundaries that delineate a boundary of each one of the plurality of solder balls with respect to the surface of the substrate;

calculate a centroid of each one of the solder ball mask boundaries; and match each one of the plurality of iso-contours in the right view to a corresponding iso-contour in the left view to form a plurality of matched iso-contours, wherein the matching comprises:

organizing nested iso-contours from each one of the right view and the left view into respective inclusion tree structures;

removing outliers from each one of the inclusion tree structures; and matching branches from each one of the inclusion tree structures to one another based on a relationship between nodes in the inclusion tree structures.

3. The method of claim 1 wherein visually segmenting the plurality of solder balls from the substrate comprises visually segmenting the plurality of solder balls from the substrate using an adaptive thresholding method based on histogram analysis.

4. The method of claim 1 further comprising calculating a centroid of each iso-contour in at least one of the plurality of matched iso-contours.

5. The method of claim 4 wherein the at least one of the plurality of matched iso-contours is the matched iso-contour with the largest average intensity gradient magnitude value.

6. The method of claim 5 further comprising triangulating a distance between the centroid of each iso-contour in the at least one of the plurality of matched iso-contours and the centroid of a corresponding one of the solder ball mask boundaries to determine a height of a solder ball.

7. The method of claim 4 further comprising triangulating a distance between the centroid of each iso-contour in the at least one of the plurality of matched iso-contours and the centroid of a corresponding one of the solder ball mask boundaries to determine a height of a solder ball.

8. The imaging processor of claim 2 wherein visually segmenting the plurality of solder balls from the substrate comprises visually segmenting the plurality of solder balls from the substrate using an adaptive thresholding method based on histogram analysis.

9. The imaging processor of claim 2 wherein the memory further includes instructions which, when executed by the processor, cause the imaging processor to calculate a centroid of each iso-contour in at least one of the plurality of matched iso-contours.

10. The imaging processor of claim 9 wherein the at least one of the plurality of matched iso-contours is the matched iso-contour with the largest average intensity gradient magnitude value.

11. The imaging processor of claim 10 wherein the memory further includes instructions which, when executed by the processor, cause the imaging processor to triangulate a distance between the centroid of each iso-contour in the at least one of the plurality of matched iso-contours and the centroid of a corresponding one of the solder ball mask boundaries to determine a height of a solder ball.

12. The imaging processor of claim 9 wherein the memory further includes instructions which, when executed by the processor, cause the imaging processor to triangulate a distance between the centroid of each iso-contour in the at least one of the plurality of matched iso-contours and the centroid of a corresponding one of the solder ball mask boundaries to determine a height of a solder ball.

* * * * *